(12) United States Patent
Raciborski et al.

(10) Patent No.: US 7,213,062 B1
(45) Date of Patent: May 1, 2007

(54) SELF-PUBLISHING NETWORK DIRECTORY

(75) Inventors: Nathan F. Raciborski, Jackson, WY (US); Mark R. Thompson, Phoenix, AZ (US)

(73) Assignee: General Instrument Corporation, Horsham, PA (US)

( * ) Notice: Subject to any disclaimer, the term of this patent is extended or adjusted under 35 U.S.C. 154(b) by 1162 days.

(21) Appl. No.: 09/664,294

(22) Filed: Sep. 18, 2000

Related U.S. Application Data

(60) Provisional application No. 60/209,007, filed on Jun. 1, 2000.

(51) Int. Cl.
 G06F 15/16 (2006.01)
 G06F 15/173 (2006.01)
(52) U.S. Cl. .................. 709/223; 709/202; 709/218
(58) Field of Classification Search ............ 709/223, 709/224, 202, 218
 See application file for complete search history.

(56) References Cited

U.S. PATENT DOCUMENTS

| | | | |
|---|---|---|---|
| 5,855,020 A | 12/1998 | Kirsch | |
| 5,862,325 A * | 1/1999 | Reed et al. | 709/201 |
| 5,870,557 A | 2/1999 | Bellovin et al. | |
| 5,956,716 A | 9/1999 | Kenner et al. | |
| 5,991,306 A | 11/1999 | Burns et al. | |
| 6,003,030 A | 12/1999 | Kenner et al. | |
| 6,021,118 A | 2/2000 | Houck et al. | |
| 6,029,175 A | 2/2000 | Chow et al. | |
| 6,038,599 A * | 3/2000 | Black et al. | 709/223 |
| 6,052,714 A | 4/2000 | Miike et al. | |
| 6,052,718 A | 4/2000 | Gifford | |
| 6,061,686 A | 5/2000 | Gauvin et al. | |
| 6,065,012 A | 5/2000 | Balsara et al. | |
| 6,065,017 A | 5/2000 | Barker | |
| 6,098,078 A | 8/2000 | Gehani et al. | |
| 6,101,180 A | 8/2000 | Donahue et al. | 370/352 |
| 6,108,703 A | 8/2000 | Leighton et al. | |
| 6,112,239 A | 8/2000 | Kenner et al. | |

(Continued)

FOREIGN PATENT DOCUMENTS

EP 0837584 A1 4/1998

(Continued)

OTHER PUBLICATIONS

Clare Bradford et al., A Bandwidth Friendly Search Engine, *Proceedings Of The International Conference on Multimedia Computing And Systems*, Los Alamitos, CA, Jun. 7, 1999, vol. 2, pp. 720-724.

(Continued)

*Primary Examiner*—Philip Tran
*Assistant Examiner*—Kevin T Bates
(74) *Attorney, Agent, or Firm*—Thomas Bethea, Jr.

(57) ABSTRACT

The invention relates to the interaction between the electronic directory and sites cataloged therein. One embodiment of a directory system includes a first and second conduit, a receiver function and a global catalog. The first conduit runs between the directory and a first site and the second conduit runs between the directory and a second site. The receiver function accepts the first local catalog of directory information from the first site and the second local content catalog of directory information from the second site. The global catalog of directory information includes the first local catalog and the second local catalog.

21 Claims, 18 Drawing Sheets

U.S. PATENT DOCUMENTS

| | | | |
|---|---|---|---|
| 6,175,869 B1 | 1/2001 | Ahuja et al. | |
| 6,185,598 B1 | 2/2001 | Farber et al. | 709/200 |
| 6,195,681 B1* | 2/2001 | Appleman et al. | 709/203 |
| 6,209,036 B1 | 3/2001 | Aldred et al. | |
| 6,216,123 B1 | 4/2001 | Robertson et al. | |
| 6,311,216 B1 | 10/2001 | Smith et al. | |
| 6,418,452 B1* | 7/2002 | Kraft et al. | 707/200 |
| 6,473,749 B1 | 10/2002 | Smith et al. | |
| 6,505,248 B1* | 1/2003 | Casper et al. | 709/224 |
| 6,516,337 B1* | 2/2003 | Tripp et al. | 709/202 |
| 6,539,381 B1 | 3/2003 | Prasad et al. | |
| 6,546,387 B1 | 4/2003 | Triggs | |
| 6,581,090 B1 | 6/2003 | Lindbo et al. | |
| 6,606,657 B1* | 8/2003 | Zilberstein et al. | 709/224 |

FOREIGN PATENT DOCUMENTS

| | | |
|---|---|---|
| EP | 0847020 A2 | 6/1998 |
| EP | 0877326 A2 | 11/1998 |
| WO | WO98/17039 | 4/1998 |
| WO | WO98/18076 | 4/1998 |
| WO | WO98/26559 | 6/1998 |
| WO | WO98/37667 | 8/1998 |
| WO | WO98/53410 | 11/1998 |
| WO | WO98/58315 | 12/1998 |
| WO | WO99/03047 | 1/1999 |
| WO | WO99/05584 | 2/1999 |
| WO | WO00/13456 | 3/2000 |
| WO | WO00/17765 | 3/2000 |
| WO | WO00/28424 | 5/2000 |
| WO | WO 00/73922 | 12/2000 |
| WO | WO 00/74347 | 12/2000 |
| WO | WO 00/79730 | 12/2000 |

OTHER PUBLICATIONS

Alex Rousskov et al., Cache Digests, *Computer Networks and ISDN Sytstems*, North Holland Publishing, Amsterdam, NL. Nov. 25, 1998, vol. 30, No. 22-23, pp. 2155-2168.

Sun Wu et al., Virtual Proxy Servers For WWW And Intelligent Agents On The Internet, *System Sciences, 1997, Proceedings Of The Thirtieth Hwaii International Conference On Wailea, HI*, Los Alamitors, CA, Jan. 7, 1997, pp. 200-209.

Luis Aversa et al., Load Balancing A Cluster Of Web Servers Using Distributed Packet Rewriting, *Computer Science Department Technical Report*, New York, NY, Jan. 6, 1999 pp. 1-13.

Dykes, Sandra G. et al., Taxonomy and Design Analysis for Distributed Web Caching, *Proceedings of the 32nd Annuyal Hawaii International Conference on Systems Sciences*, Maui, HI, Jan. 5-8, 1999, pp. 1-10.

Fan, Li, et al., Summary Cache: A Scalable Wide-Area Web Cache Sharing Protocol, *Computer Communications Review, Association For Computing Machinery*, New York, Oct. 1998, vol. 28, No. 4, pp. 254-265.

Gadde, Syam et al., A Taste of Crispy Squid, *Proceedings of the Workshop on Internet Service Performance*, Jun. 1998, pp. 1-8.

Gadde, Syam et al., Reduce, Reuse, Recycle, an Approach to Building Large Internet Caches, *The Sixth Workshop on Hot Topics in Cape Cod, MA*, May 5-6, 1997, pp. 93-98.

Syam Gadde et al., Web Caching and Content Distribution: A view From The Interior, *Online Proceedings of the 5th International Web Caching and Content Delivery Workshop*, retrieved from Internet on Apr. 10, 2002, Abstract, Sections 1 and 2.

Gulwani, Sumit et al. WebCaL—A Domain Specific Language For Web Caching, *Online Proceedings Of The 5th International Web Caching And Content Delivery Workshop*, at <http://www.terena.nl/conf/wcw/Proceedings/S2/S2-4.ps>, May 2002.

Gwertzman, James et al., An Analysis Of Geographical Push-Caching, *Harvard University, Vino Research Group, World Wide Web Research* at <http://www.eecs.harvard.edu/vino/web/server.cache/icdcs.ps> Mar. 28, 2002.

Inohara, Shigekazu et al., Self-Organizing Cooperative WWW Caching, *Proceedings, 18th International Conference on Amsterdam, Netherlands*, May 26-29, 1998, pp. 74-83.

Kanchanasut, Kanchana, The AI3 CacheBone Project, *Internet Project Workshop*, IWS 99 Osaka, Japan, Feb. 18-20, 1999, pp. 203-208.

Kangasharju, Jussi et al., Locating Copies of Objects Using the Domain Name System, *Proceedings of the 4th International Caching Workshop*, 1999, pp. 1-12.

Tewari, Renu et al., Beyond Hierarchies: Design Considerations for Distributed Caching On The Internet, *UTCS Technical Report*, Feb. 1998, pp. 1-22.

Touch, Joseph D., Defining High-Speed Protocols: Five Challenges And An Example That Survives The Challenges, *IEEE Journal On Selected Areas In Communications*, IEEE Inc., New York, Jun. 1, 1995, vol. 13, No. 5, pp. 828-835.

Zhang, Xiaolan et al., HACC: An Architecture For Cluster-Based Web Servers, *Proceedings Of The 3rd Usenix Windows NT Symposium*, Seattle, WA, Jul. 12-15, 1999, pp. 155-164.

Jussi Kangasharju et al., "Locating Copies of Objects Using the Domain Name System", Institut Eurecom, Sophia Antipolis, France, France Telecom—CNET, Issy les Moulineaur, France, 12 pages.

* cited by examiner

SELF-PUBLISHING NETWORK DIRECTORY

This application claims the benefit of U.S. Provisional Application No. 60/209,007 filed on Jun. 1, 2000.

CROSS-REFERENCES TO RELATED APPLICATIONS

This application is being filed concurrently with related U.S. patent applications: Ser. No. 09/665,204, entitled "A QOS BASED CONTENT DISTRIBUTION NETWORK"; Ser. No. 09/665,205, entitled "CONTENT MANAGER"; Ser. No. 09/664,148, entitled "VIEWER OBJECT PROXY"; Ser. No. 09/664,147, entitled "CONTENT TRACKING"; Ser. No. 09/665,203, entitled "ACTIVE DIRECTORY FOR CONTENT OBJECTS"; Ser. No. 09/664,139, entitled "METHOD FOR PROVIDING MULTIPLE ADDRESSES"; Ser. No. 09/664,036, entitled "CLIENT SIDE DETERMINISTIC ROUTING AND TRANSPARENT REDIRECTION"; Ser. No. 09/664,179, entitled "SYSTEM FOR NETWORK ADDRESSING"; Ser. No. 09/664,509, entitled "SELECTIVE ROUTING"; Ser. No. 09/663,555, entitled "CLIENT SIDE HOLISTIC HEALTH CHECK"; Ser. No. 09/664,037, entitled "CLIENT SIDE ADDRESS ROUTING ANALYSIS"; Ser. No. 09/663,551, entitled "RESIZABLE GRAPHICAL USER INTERFACE"; Ser. No. 09/663,554, entitled "REVERSE CONTENT HARVESTER"; all of which are incorporated herein by reference.

BACKGROUND OF THE INVENTION

This invention relates in general to electronic directories and, more specifically, to the interaction between the electronic directory and sites cataloged therein.

There is a desire to provide electronic directories on the Internet to allow searching for information. Conventional directories search the whole Internet by "crawling" from link to link and cataloging the information that is encountered. These crawling software bots or "crawlers" traverse the Internet constantly in an attempt to keep the directory information current. One pass through the Internet can take months.

Many electronic directories have crawlers associated with them that gather information across the Internet. When a crawler encounters information it is passed back to the electronic directory for cataloging. In this way, the crawlers consume tremendous bandwidth from the Internet that would otherwise be available to others.

Information cataloged in electronic directories is often stale. Clicking on the links provided by the directory often reveals many links are broken and/or the information in the catalog no longer accurately describes the state of the referenced web site. More quickly than the changes are uncovered by crawling, the contents of the Internet change. For example, a web page that describes a weekly television show may change weekly, but the crawler will only catalog it at a much slower frequency. Broken links and stale information reduce the usefulness of electronic directories on the Internet.

SUMMARY OF THE INVENTION

The invention relates to the interaction between the electronic directory and sites cataloged therein. One embodiment of a directory system includes a first and second conduit, a receiver function and a global catalog. The first conduit runs between the directory and a first site and the second conduit runs between the directory and a second site. The receiver function accepts the first local catalog of directory information from the first site and the second local content catalog of directory information from the second site. The global catalog of directory information includes the first local catalog and the second local catalog.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

DESCRIPTION OF THE SPECIFIC EMBODIMENTS

The present invention the accuracy of electronic directories and gathers the directory information more efficiently. Origin servers catalog and report their content objects to a central active directory according to a predetermined schedule. The content catalogs from all the origin servers are stored in a common database. Queries to the database provide directory information for the users.

In the Figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
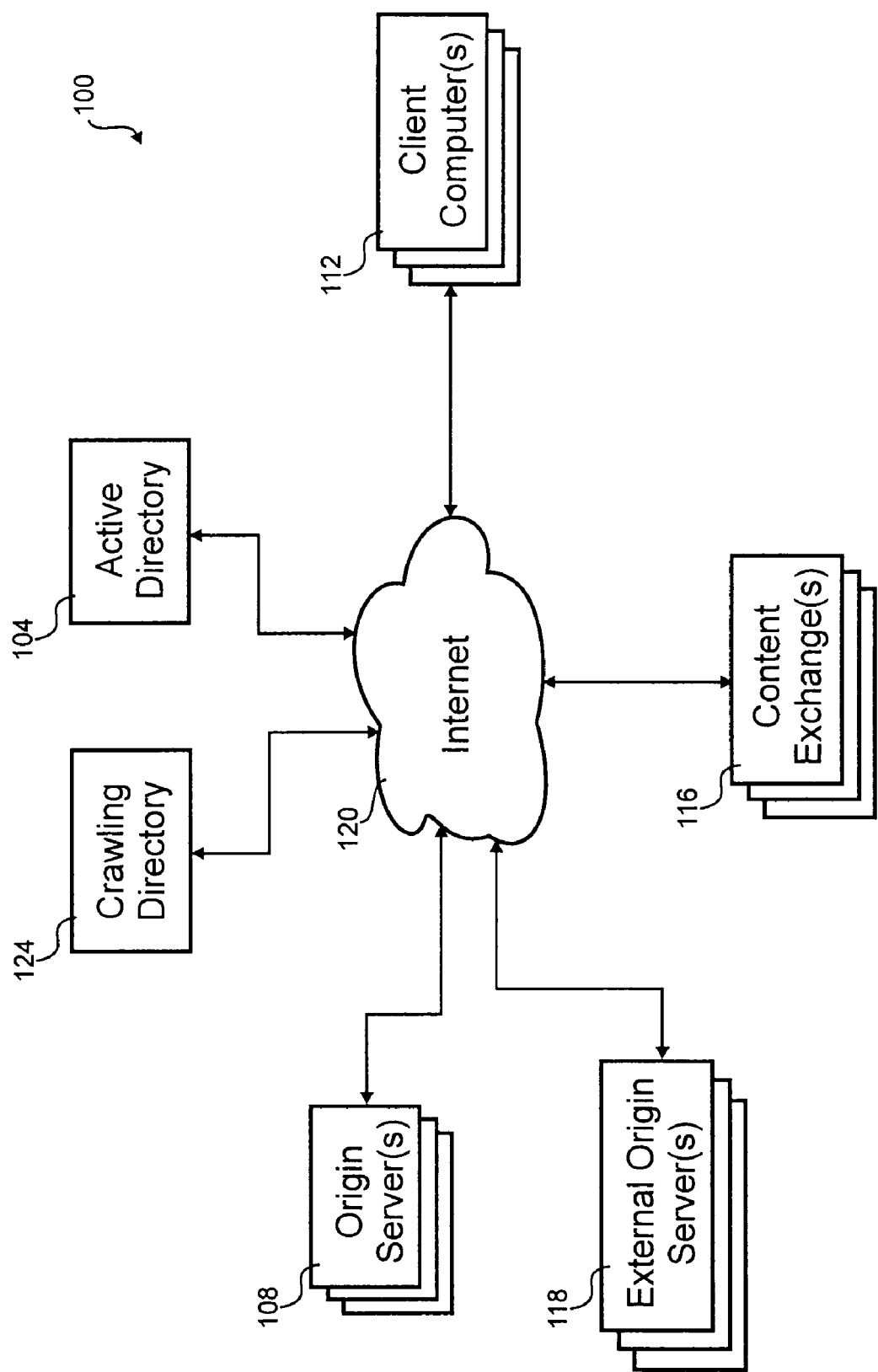
FIG. 1 is a block diagram of an embodiment of a content distribution system.

Referring to FIG. 1, a block diagram of an embodiment of a content distribution system 100 is shown. In this embodiment, the content distribution system 100 includes an active directory 104, one or more origin servers 108, one or more client computers 112, one or more content exchanges 116, one or more external origin servers 1118, the Internet 120 and a crawling directory 124. A particular client computer 112 interacts with the active directory 104 to select a content object for download. The object can be played during download if it is streaming media or can be stored for a later time. The content object could be any type of information, such as audio, video or data, that is available for download from a network. The request for the content object is forwarded to the appropriate origin server 108 along with preference information from the client computer 112. The origin server 108 decides where the object is downloaded from. In order to provide sufficient QOS, any of the content exchanges 116 or even the origin server 108 itself could provide the object.

The active directory 104 can be the interface to the client computer 112 for selecting a content object. Software for both the origin server 108 and optionally for the client computer 112 can be downloaded from the active directory 104 to enable the content distribution system 100. Either a directory interface page or a search interface page may be used to determine the content object desired. The interfaces are maintained in an active manner to avoid broken links to content objects on the origin servers 108. When a content object is needed from the origin server 108 by a content exchange 116, the active directory 104 can provide a path back to the proper origin server 108.

Other embodiments could have multiple active directories. Users of the system could be divided amongst the several active directories to distribute the loading. Additionally, the other active directories could be used for redundancy such that if one active directory were offline, the others would absorb the loading.

In some embodiments, the origin server 108 provides the source of a content object, directs a user to a preferred source of the content object and provides directory information to the active directory 104. Content objects are introduced to the system 100 by origin servers 108. Introduction involves selection by an origin server administrator of the content objects to make available to the active directory 104. The administrator is person or system that manages the origin server 108. The content objects could include previously stored information or a streaming feed of information. According to a predetermined cycle, the origin server 108 provides a catalog of the selected information that is updated as the content on the origin server 108 changes.

The origin server 108 determines the preferred source to direct the client computer 112 to in order to download the content object. The preference list of the client computer 112, the loading of the content exchanges and the location of copies of the content object are all considerations of the origin server 108 in redirecting the client computer to the preferred source of the information. That source could be the origin server 108 itself or one of the content exchanges 116.

The user directs the client computer 112 to find the desired content object and subsequently download that object. Using viewer object proxy software downloaded from the active directory 104, the client computer 112 determines the content exchanges 116 that can deliver content with the adequate QOS. The process of determining a content exchange 116 with adequate QOS involves, for example, receiving test information from the content exchanges that are likely to produce the best results in preparing a preferred list. The user can modify the preferred list of content exchanges 116 if a customized approach is desired. When the origin server 108 is deciding the source of the content object, the preference information is used to provide adequate QOS.

The external origin servers 118 can be additional sources of content objects available to the client computer 112. In an embodiment, external origin servers 118 are coupled to a content exchange 116.

The content exchanges 116 are caches for content objects. A number of these content exchanges 116 are distributed to different points of the Internet 120 to cache content objects. Information can be cached based upon a number of considerations, such as the desirability of information to users, as a service to origin servers 108 who want their content readily available to users, or as a service to users who want improved QOS. Grouping of the content exchanges 116 could be in clusters or individually to service the demand of client computers 112 for content objects.

When a requested content object or part of a requested content object is not found by a user requesting it from a content exchange 116, a request by the content exchange 116 to other content exchanges is made for that content object. If no other content exchanges 116 have the content object, the active directory 104 is queried for the origin server 108 who is the source of the content object and the content object is downloaded from there. While the content exchange 116 is gathering the content object, the client computer 112 is receiving the initial portions that are available. The content object could be stored in pieces on several content exchanges 116 and the requesting content exchange 116 will retrieve those pieces to reassemble the whole content object as needed by the client computer 112.

In some embodiments, when a requested content object or part of a requested content object is not found by a user requesting it from a content exchange 116, a request by the content exchange 116 to an external origin server 118 can be made retrieve the requested content object.

A crawling directory 124 is used to supplement the catalog information reported by the origin servers 108. When searching for content objects for a user, the active directory 104 could display content objects available from the origin servers 108 and other content objects uncovered by the crawling directory 124. By traversing the web, crawling directories 124 catalog the content objects and other information they encounter. For example, a keyword search of the catalog can direct the user to a content object not available from any origin server on the system 100. One of the content exchanges 116 could be selected by the active directory 104 to cache the content object as the client computer 112 downloads it. Although only one crawling directory 124 is used in this embodiment, other embodiments could use a number of crawling directories to offer additional search results.

The Internet 120 is comprised of servers linked together by routers. Data is divided into packets that travel through the Internet 120 by hopping from one router to the next until the destination is reached. Each packet may take a different route through the Internet and arrive at the destination at a different time. Additionally, some packets can be lost during travel through the Internet 120 as the bandwidth of any router saturates. As the number of hops between the source of a content object and the destination increases, so does the likelihood of excessive delay and packet loss.

As the content object traverses a path from source to destination through the Internet 120, the smallest bandwidth between any two routers in the path defines the maximum bandwidth of that path. Generally, the bandwidth from the Internet 120 to the client computer has the least bandwidth allocation. At other times, some other hop between routers has the smallest bandwidth. Caching the content object in a content exchange 116 with a minimal amount of hops between the content exchange 116 and the client computer 112 improves the likelihood of adequate QOS.

Downloading the content object at a desired data-rate that does not exceed the data-rate of the client computer to the Internet 120 is adequate QOS. The maximum QOS a user can expect is defined by the speed of their network connection, the processing power of their computer and other factors. The minimum QOS is subjectively defined by the user based upon the quality they desire within certain limits. For example, a user with a 400 Kbps network connection and a fast computer may have a choice of a 28 Kbps, 56 Kbps, or 128 Kbps stream for an audio clip from which the user chooses the 128 Kbps stream. So long as the datarate provided by the client computer is in the range of 128–400 Kbps, adequate QOS is possible for that stream.

Although the above embodiment primarily uses the Internet 120 to connection between the various blocks, other embodiments could use private links outside the Internet 120. Additionally, content objects outside the system 100 could benefit from the system 100 to the extent caching, encryption and compression is provided.

Figure 2:
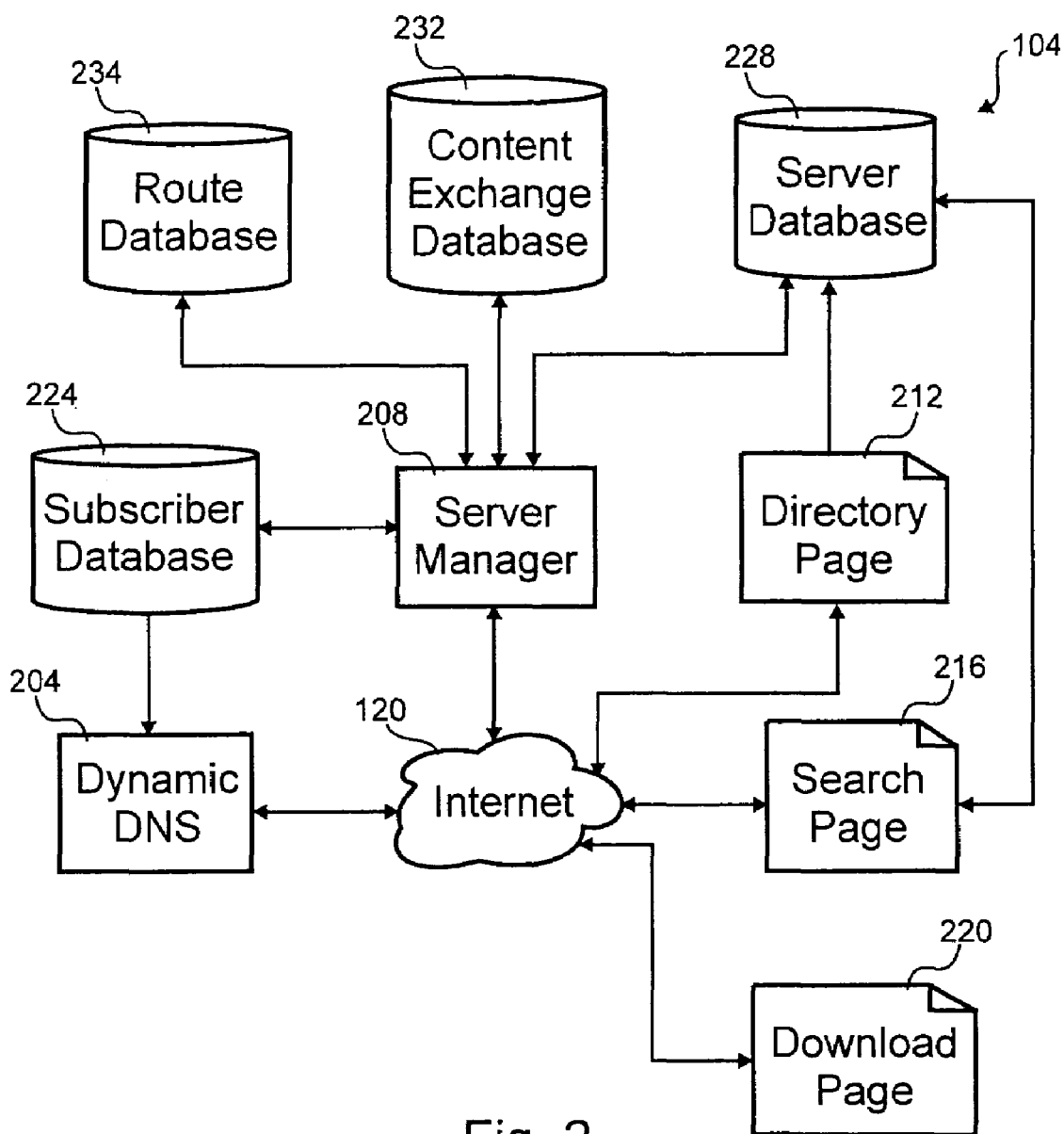
FIG. 2 is a block diagram of an embodiment of an active directory portion of the content distribution system.

With reference to FIG. 2, a block diagram of an embodiment of an active directory portion 104 of the content distribution system 100 is shown. Included in the active directory 104 are a dynamic domain name server (DNS) 204, a server manager 208, a directory page 212, a search page 216, a download page 220, a subscriber database 224, a server database 228, a content exchange database 232, and a route database 234. The content distribution system 100 interacts with the active directory 104 to provide directory information to the user and assist in downloading a content object to the user.

Both the user of the client computer 112 and the administrator of the origin server 108 are subscribers to the content distribution system 100. Software is downloaded from a download page to the user and/or administrator. The software for the client computer 112 is optional in some embodiments and improves QOS. The software for the origin server 108 allows the active directory 104 to update the content available on the system 100 and to direct the client computer 112 to a preferred source for receiving that content.

The client computer 112 attaches to the domain of the active directory 104 to find a desired content object. Depending on preference, the user may use a directory page 212 or search page 216 to find the content object. The search page 216 may be a traditional boolean search engine that accesses a catalog of the content objects provided by all origin servers 108 as well as information gathered from the crawling directory 124. Other embodiments could only display information from the crawling directory 124 after a search of the content from the origin servers 108 is unsuccessful or omit information from the crawling directory 124 altogether. The catalog of content objects for all origin servers 108 is maintained in the server database 228.

The directory page 212 organizes the possible content objects in a hierarchy of categories that are organized by subject. For example, the first page might show a number of topics of general interest where the user selects sports. In the next page, which is one level down in the hierarchy, a number of sports are displayed where the user selects football. Down another level in the hierarchy, the user may select the San Diego Chargers™ to see another page of related content object links.

The administrator categorizes the content on the origin server 108 to allow the directory page 212 to present it properly. On a site, directory or file basis, the administrator can choose a category for content objects in an HTML SSI tag associated with that content object. This classification is harvested and stored on the active directory to allow presenting content objects in different categories. Additionally, a moderator may describe and arrange content objects in the categories for the directory page 212. For example, the moderator could mark certain content objects for more prominent display and/or add a review for the content object.

The server manager 208 maintains information on all client computers 112, all origin servers 108, all external origin servers 118, all content exchanges 116, and all content objects on origin servers 108. The information related to client computers 112 and origin servers 108 is maintained in the subscriber database 224. The full name, a login name, a password, a unique identifier, token credits available, and other information is maintained in the subscriber database 224 for each user associated with a client computer 112. This database 224 also holds the last time the origin server 108 was verified, an Internet Protocol (IP) address for the origin server 108, the port the content manager server runs upon, on-/off-line status of the origin server 108, a banner ad URL, a name for the origin server 108, a description of the origin server 108, the credits or tokens needed to use the origin server 108 or other billing model, and the number of connections or viewers allowed at one time.

Information on content objects for all origin servers 108 is maintained in the server database 228. For each content object, the origin server name, content object file name and path are stored along with category information, a brief description and keywords. The server database 228 is queried to provide content selections to the user during navigation of the directory and search pages 212, 216. To maintain current information in the server database 228, the server manager 208 periodically interacts with the origin server 108 to get the most recent changes to the catalog of content objects and to determine if the origin server 108 has gone offline. Whenever an origin server 108 goes offline, the entries in the server database 228 corresponding to that origin server 108 are removed and the status information in the subscriber database 224 is updated.

In some embodiments, the entries in the server database 228 remain even after the origin server 108 goes offline. The status is updated to reflect that the content associated with the origin server is unavailable, but the information remains stored in the server database 228. If the status is updated to online, the information is once again presented to users that are searching for content objects. In some circumstances, an origin server 108 may indicate to the active directory 104 that it is going offline for a period of time. Presuming the period of time is short, the active directory can keep information in the server database 228 without presenting it to users.

A list of the content exchanges 116 available to the system 100 is maintained by the server manager 208 in the content exchange database 232. In some embodiments, the content exchange database 232 can include a list of IP addresses for all possible content exchanges 116 within the content distribution system 100. Further, the content exchange database 232 can include a number of content exchange fields associated with each content exchange 116. For example, fields associated with each content exchange 116 in the content exchange database 232 can include a content exchange identifier, a content exchange site, a content exchange provider, a content exchange name, a content exchange location, a content exchange status, an icon, or any other desired or needed information.

Together, the content exchange identifier and content exchange site identify a unique content exchange 116 at a particular content exchange site. The content exchange provider is an indicator of the party responsible for the content exchange, such as XYZ company. The content name is a domain name and the content exchange location can be geographic coordinates for a content exchange 116. In an exemplary embodiment, the content exchange database 232 includes a content exchange identifier, a content exchange site, a content exchange IP address, a content exchange provider, a content exchange name, a content exchange location, and an icon for each content exchange 116 in the content exchange database 232.

In general, the content exchange database 232 can be regionalized or partitioned by a variety of methods including, but not limited to, improved QOS criteria or subscription services criteria. Additionally, the content exchange database 232 can include a listing of alternative active directories 104, origin servers 108, or any other useful or necessary information.

The content exchanges 116 in the system 100 regularly provide status to the server manager 208. As content exchanges 116 become available or unavailable, their operational status is reported to the server manager 208 and recorded in the content exchange database 232. In some embodiments, the content exchange database 232 can include additional status information including content exchange 116 loading, capacity, utilization, and health.

The routing database 234 includes a list of external origin servers 118. In some embodiments, the routing database 234 includes identification, status and organization information related to the external origin servers 118. Identification information can include an IP address and a domain name for an external origin server 118. Status information can include availability, loading or other status about the external origin server. Organization information can include a list of alternative external origin servers 118. In an embodiment, the routing database 234 includes an IP address and a domain name for each external origin server 118. In some embodiments, identifying an external origin server 118 in the routing database 234 is the mechanism for associating the external origin server 118 with the content distribution system 100.

For each external origin server 118 in the routing database, there are a list of user names that are allowed to use a content exchange 116 to access the information on the external origin server 118. The user name is unique to the user of the client computer 112. A list of external origin servers 118 a client computer can route through a content exchange is provided to the client computer 112. The client computer 112 uses the information from the routing database to redirect user requests for an external origin server 118 to a content exchange 116. After the content exchange 116 populates with the content objects from the external origin server 118, bandwidth is offloaded from the external origin server 118 to the content exchange 116. The user may pay the owner of the content exchange and/or the administrator of the origin server for this enhanced service.

The dynamic DNS 204 provides an origin server name for each IP address for the origin servers 108. The origin server name uniquely identifies the origin server 108 on the Internet 120. This information is maintained in the subscriber database 224. The content exchange 116 does not know the IP address of the origin server 108 that provided the content object to the content exchange 116, but knows the origin server name. When a content exchange 116 wants to populate its cache with a content object or a portion of a content object that is not available from other content exchanges 116, the dynamic DNS 204 is queried to determine the IP address or domain name of the origin server 108 that is the source of the content object. If a domain name is retrieved from the dynamic DNS 204 the IP address corresponding to that domain name is retrieved from a DNS.

Figure 3A:
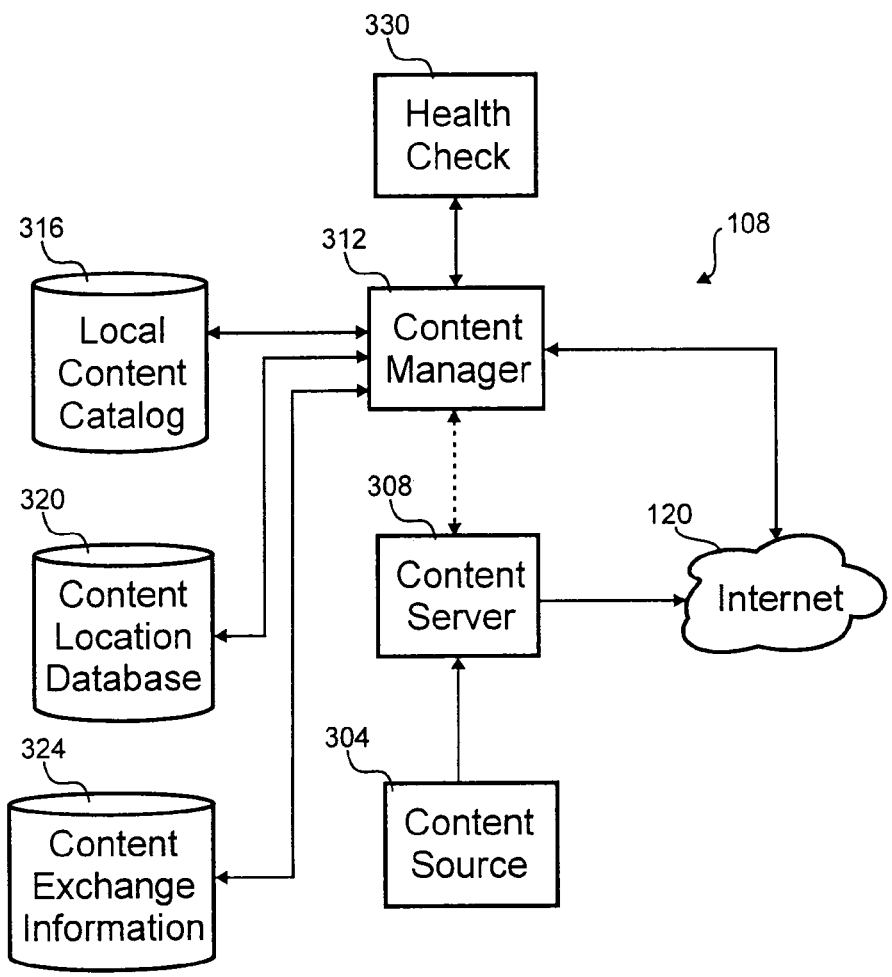
FIG. 3A is a block diagram of an embodiment of an origin server portion of the content distribution system.

Referring next to FIG. 3A, a block diagram of an embodiment of an origin server portion 108 of the content distribution system 100 is shown. The origin server 108 is managed by an administrator and provides one source of content objects to the content distribution system 100. QOS is provided by the origin server 108 directing the client computer to a content exchange 116 that can efficiently deliver the desired content object. Included in the origin server 108 are a content source 304, a content server 308, a content manager 312, a local content catalog 316, a content location database 320, content exchange information 324, and a health check 330.

Content is provided to the origin server 108 by a content source 304. The content source 304 could be a live web cam, a video or audio feed, a data object, a data stream, a video tape or audio tape, an optical or magnetic disk, or any other content delivery mechanism. Content objects are delivered by the content source 304 to the content server 308 for possible distribution to the system 100.

Time and date information is maintained in each content exchange 116 for the content objects or portions of content objects maintained therein. The time and date information allows distinguishing content objects which may have the same origin sever name, path name and file name. Other embodiments could use any unique code such as a checksum, CRC or hash to uniquely identify a content object.

All content objects of the origin server 308 are stored on the content server 308. The administrator can select a content object or groups of content objects for publishing to the system 100 while leaving other content objects on the content server 308 that are unavailable to the system 100. Some content objects are discreet files, but others are streams of content produced, for example, by live web cams. The software that runs the content server 308 may be integrated with the software of the content manager 312.

The content manager 312 publishes the desired content objects to the system 100 and directs users to the preferred content exchange 116 for downloading content objects associated with the content manager 312. At the direction of the administrator, the content manager 312 selects content objects or groups of content objects by filename, directory or drive volume for publishing to the active directory 104. Some content objects on the content server 308 may be excluded from publishing such that they are not available to the system 100.

The content objects selected for publishing to the system are maintained in a local content catalog 316. Entries in the local content catalog 316 are kept current by the content manager 312 as the objects corresponding to those entries may become unavailable or updated. For each entry, the content object file name and path are stored along with category information, a brief description and keywords. Upon attachment to the system 100, the local content catalog 316 is sent by the content manager 312 to the active directory 104 for entry to the server database 228. Periodically, changes to the local content catalog 316 are sent to the server database 228 to keep the directory information as current as possible. Updates could happen on a regular interval such as every two minutes and/or whenever a change in the local content catalog is made.

The content manager 312 also knows the location of all portions of content objects associated with that content manager 312. Upon attaching to the system 100, the content manager 312 contacts each of the content exchanges 116 for status. The content exchange 116 periodically reports on its content object or content object portions to the associated content managers 312. Armed with this information, the content manager 312 can direct a client computer 112 to a content exchange 116 that may have some or all of the desired content object available for download.

Location information for content objects that is reported by all the content exchanges 108 is maintained by the content manager in the content location database 320. By querying the content location database 320, the content manager 312 can determine the content exchanges 116 that contain a content object or a portion of a content object. During the routing of the client computer 112 to a content source, the presence of the content object in a particular content exchange 112 can affect the routing determination.

The content exchange information store 324 holds information on all active content exchanges 116. Upon power-up of the origin server 108, the content exchange database 232 in the active directory 104 is downloaded into the content exchange information store 324. All the content exchanges 116 listed in the content exchange information store 324 are queried after power-up for status information that is retained as content exchange information 324. The status information includes the number of concurrent links used, total number of concurrent links allowed, bandwidth utilization, and cache churn rate. The churn rate of the cache is the amount of time unused data remains in the cache and is indicative of the loading of the cache. For example, data is usually flushed out of the cache quickly for content exchanges 116 that are busy relative to the amount of storage in the cache. However, some embodiments that could have sticky content objects that remains pinned in the content exchange 116 for a period of time regardless of use.

The content manager 312 intelligently redirects the client computer 112 wanting a content object to the preferred source for that object. Preference information provided from the client computer 112 is used to determine the sources of the content object preferred by the client computer 112. This information is used along with the current locations of the content object and the loading of the possible content exchanges in order to direct the client computer 112 to the preferred content exchange 116 for download of the content object.

In some embodiments, the content manager 312 can regulate access to content objects. When a client computer 112 attempts to download a content object associated with a content manager 312, a login dialog can be presented if the administrator has secured the content object. The user may enter a user name and/or password in the login dialog to enable redirection of the client computer 112 to a source for the content object. This user name and/or password is in addition to any required for the active directory 104. Before redirecting the client computer 112 to that source, the user name and/or password or login information is checked against a list of acceptable login information previously stored on the origin server 108. Access to a whole origin server 108 or a volume, a directory or a content object on the origin server 108 may be regulated in this manner.

Some embodiments, allow the origin server 108 or active directory 104 to preload content objects on a content exchange 116. The requests for content objects are monitored to determine desirability. Desirability information, billing information and/or other considerations are used to determine which content objects to preload on a content exchange 116. Either the origin server 108 or active directory 104 can request the content objects from a content exchange 116 to preload them there. Periodically, the content objects could be requested to keep them loaded on the content exchange such that they are not unloaded because of inactivity.

The health check 330 can be either a hardware or software application which provides operational characteristics of an associated origin server 108. In an embodiment, the health check 330 provides a single indication of origin server 108 status. The single indication is a normalized value between zero and one indicating a combination of origin server characteristics. For example, it could include a CPU load, a CPU temperature, a number of concurrent connections, and/or a number of requests an origin server is facilitating. In an alternate embodiment, the health check 330 could monitor characteristics of a content exchange 116 while running on another content exchange 116 or origin server 108.

Figure 3B:
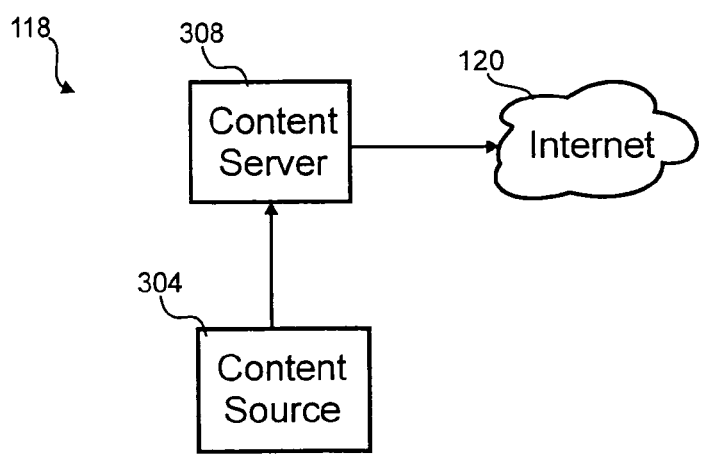
FIG. 3B is a block diagram of an embodiment of an external origin server portion of the content distribution system.

Referring next to FIG. 3B, a block diagram of an embodiment of an external origin server portion 118 of the content distribution system 100 is shown. The external origin server 118 differs from the origin server 108 in that the external origin server 118 does not have content manager software installed upon it. Included in the external origin server 118 are a content server 308 and a content source 304.

The administrator of the external origin server 118 determines one or more client computers 112 authorized for receiving content objects through a content exchange 116. The routing database 234 is updated by the administrator to allow individual client computers 112 to access the content objects through a content exchange 116. A web page on the active directory provides an interface to entering information on client computers 112 into the routing database 234. Other embodiments could automate the interface between the external origin server 118 and the routing database 234.

The updates to the routing database 234 are downloaded and stored locally by client computer 112. Subsequent attempts to access the external origin server 118 are redirected to a content exchange 116 to service that request. Redirection in this way allows an external origin server 118 to redirect client computers 112 to a content exchange 116 without assistance from content manager software.

An external origin server 118 may have one or more content exchanges 116 assigned to carry content objects for the external origin server 118. The routing database 234 could redirect subscribing client computers to one or more of these content exchanges 116. If the client computer were allowed to use two or more of these content exchanges 116, a client-side routing analysis would be performed on the two or more content exchanges to allow ranking of the relative QOS between them.

The content objects of an external origin server 118 can be preloaded to a content exchange(s) allocated to provide those content objects. To decrease latency when a content object is requested for the first time, the active directory 104 can crawl the external origin server 118 to determine the content objects available from that server 118. The available content objects may be added to the crawling directory 124. Once the available content objects are known, the active directory 104 requests each content object from the associated content exchange(s) in order to cause loading of each content object on the associated content exchange(s). In this way, content objects are preloaded on the associated content exchanges.

Figure 4A:
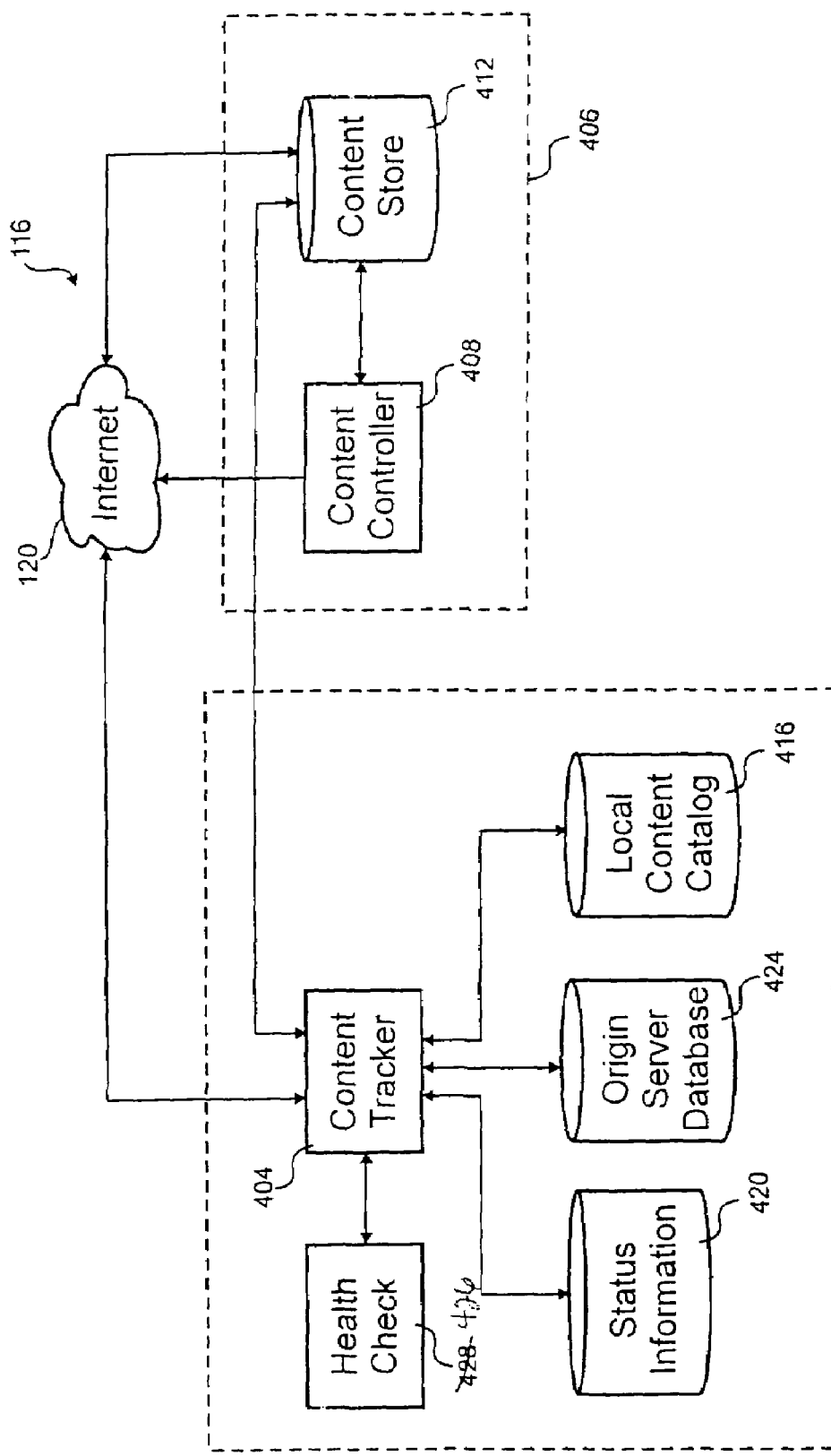
FIG. 4A is a block diagram of an embodiment of a content exchange portion of the content distribution system.

With reference to FIG. 4A, a block diagram of an embodiment of a content exchange portion 116 of the content distribution system 100 is shown. The content exchange 116 caches content objects requested by client computers 112 under the control of the content manager 312. Included in the content exchange 116 are a tracking system 402, and a content node 406. The tracking system includes a content tracker 404, a health check 426, status information 420, a local content catalog 416, and an origin server database 424 while the content node 406 includes a content controller 408 and a content store 412.

The health check 426 can be either a hardware or software application which provides operational characteristics of an associated content exchange 116. In an embodiment, the health check 426 provides a single indication of content exchange 116 status. The single indication may be a normalized value between zero and one indicating a combination of content exchange characteristics including, for example, a CPU load, a CPU temperature, a number of concurrent connections, and a number of requests a content exchange is facilitating. In an alternate embodiment, the health check 426 could monitor characteristics of a content exchange 116 while running on another content exchange 116, origin server 108 or location.

The content store 412 holds the content objects available for download to the client computers 112 from that content exchange 116. The name of the origin server 108 providing the content object along with path information and the filename is stored with the content object in the content store 412. Via the Internet 120, the client computers 112 connect to the content store 412 and download the content object file or data stream. As new content objects are added to the content store 412, old content objects are removed. The age of a content object relates to the last time a content object was accessed. Some content objects on the store 412 never age such that they stay in the store 412 for a predetermined time. An origin server 108 could arrange for the content exchange 112 to store a content object for a predetermined period of time.

When the client computer 112 requests a content object from the content store 412, the content object may not be currently loaded in the content store 412. The content store 412 notifies the content controller 408 of the unfulfilled request for the content object. The content controller 408 locates missing content objects or portions thereof in other content exchanges 116 or from the content server 308 that originated the content object. The missing content objects are loaded into the content store 412 by the content controller 408 such that the client computer 112 can download this information.

When a content object is missing from content store 412, the content controller 408 first checks with other content exchanges 116 to determine if the object is available. If no content exchange 116 has the desired content object, the content server 308 that originated the information is queried for the content object. The content store 412 does not include the IP address for the originating content server 308 so the dynamic DNS 204 is queried for that information. Given the origin server name, the dynamic DNS 204 provides the IP address such that the content controller 408 can request the content object from the proper content server 308.

The content tracker 404 reports to the system 100 the current items in the content store 412 and status information for the content exchange 116. The local content catalog 416 records the origin server name, path and filename for each content object or portion of a content object in the content store 412. As new items are added to and old items are removed from the content store 412, the local content catalog 416 is updated. When a content manager 312 connects to the system 100, a query is made to all content trackers 404 to determine what portions of content objects are stored on the content stores 412. The initial query provides a baseline to which the content tracker 404 updates as changes are made to the content store 412. The changes are sent directly to each of the content managers 312 that has content stored in the content store 412. The dynamic DNS 204 is used during this process to determine the IP address corresponding to the origin server name for each content object.

The content tracker 404 also provides status information for the content exchange 116 to the content mangers 312. The status information is sent periodically to each of the content managers 312 as a broadcast or multicast, for example, every five minutes and/or when changes occur. The status information could include the number of concurrent links to the content exchange currently in use, the total number of concurrent links allowed, the bandwidth utilization, and the cache churn rate. In other embodiments, the status information is posted to a central location that the content manager 312 can query when determining where to send a client computer 112 for a downloading a content object.

The content tracker 404 maintains the origin server database 424 to track the origin servers 108 active in the system 100. After attaching to the system, all origin servers 108 identify themselves to the content trackers 404. The content trackers 404 record the origin server name and IP address in the origin server database 424. A query to the dynamic DNS provides the IP address for a given origin server name. If an origin server 108 notifies the content tracker 404 of impending unavailability or if the content tracker 404 cannot contact a particular origin server, the entry for that origin server is removed from the origin server database 424. Additionally, the content corresponding to that origin server 108 may be purged from the content store 412 and the local content catalog 416 is updated. In some embodiments, the content object and content object portions are not purged, but are simply tagged for deletion as the storage space is needed.

In some embodiments, the content controller 408 can be instructed by the system 100 to acquire and retain predetermined content objects in the content store 412. Content objects that are anticipated to be wanted can be preloaded in preparation for the demand. The desirability of a content object can be determined by monitoring click-throughs to those content objects from the search and directory pages 212, 216. For example, content objects related to a famous person could be loaded onto content stores 412 immediately before a biography program on the famous person is aired on network television. Alternatively, users could subscribe to a service that loads content objects to some content exchanges 116. For example, a scheduled network program could be loaded to coincide with a TV broadcast the user could view over the Internet 120 in lieu of the TV broadcast. The content would be available without delay to the subscribed users.

Figure 4B:
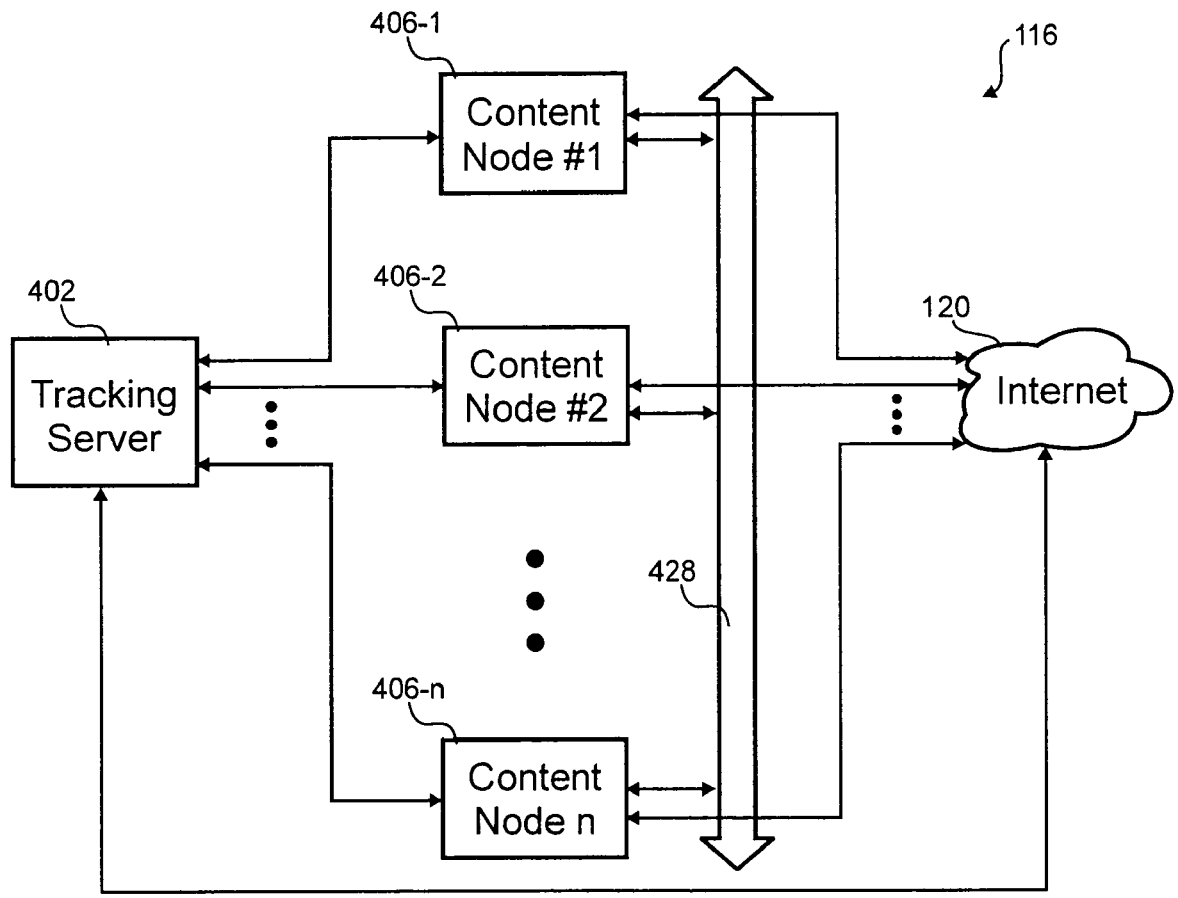
FIG. 4B is a block diagram of another embodiment of a content exchange portion of the content distribution system.

With reference to FIG. 4B, a block diagram of another embodiment of a content exchange portion 116 of the content distribution system 100 is shown. This embodiment includes multiple content nodes 406 coupled to a single tracking server 402. A content bus 428 allows content nodes 406 to check each others content stores 412 for missing content objects. The content bus 428 could also couple to other content notes in other locations. The content bus 428 may or may not travel in part over the Internet 120.

Figure 4C:
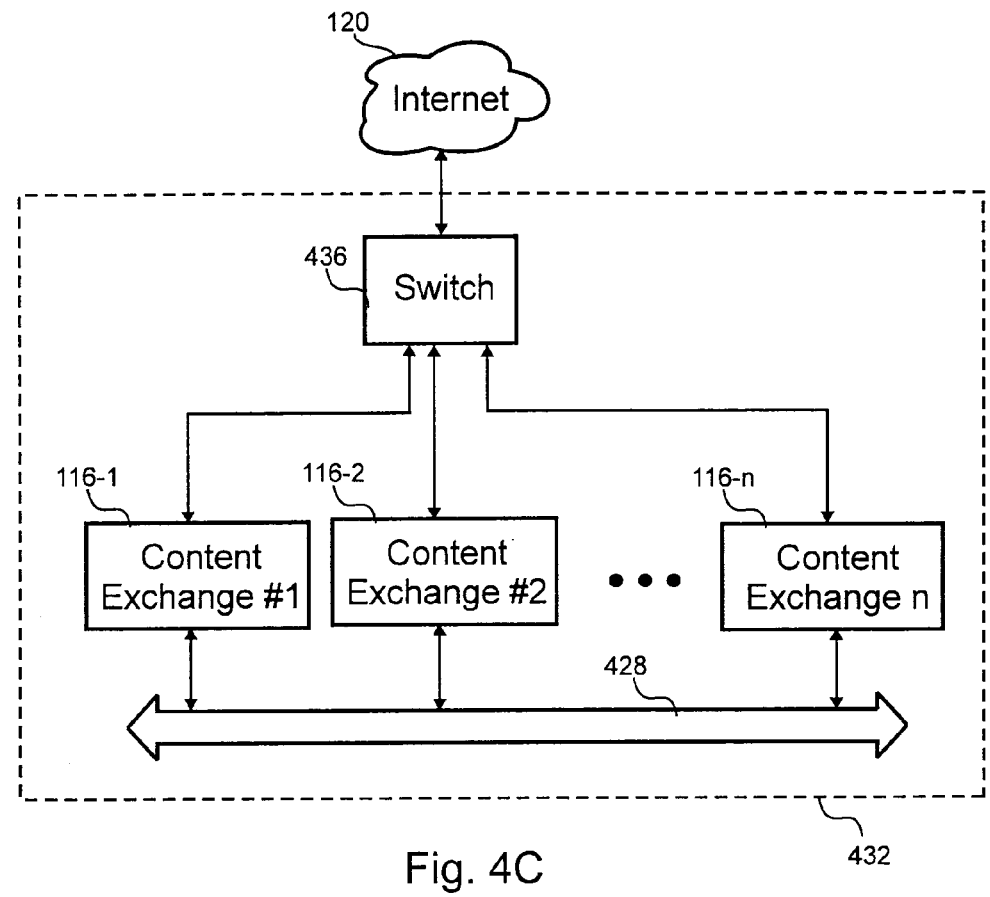
FIG. 4C is a block diagram of an embodiment of a content exchange site including multiple content exchange servers.

Referring next to FIG. 4C, a block diagram of an embodiment of a content exchange site 432 including multiple content exchange servers 116 is shown. Even though the content exchange site 432 includes multiple content exchange servers 116, it appears to the system a single content exchange 116. The load of the content exchange site 432 is distributed among the content exchange servers 116. A switch 436, such as a layer four switch, distributes the content object requests to the content exchanges 116 and aggregates the spooled responses to the Internet 120.

Figure 5:
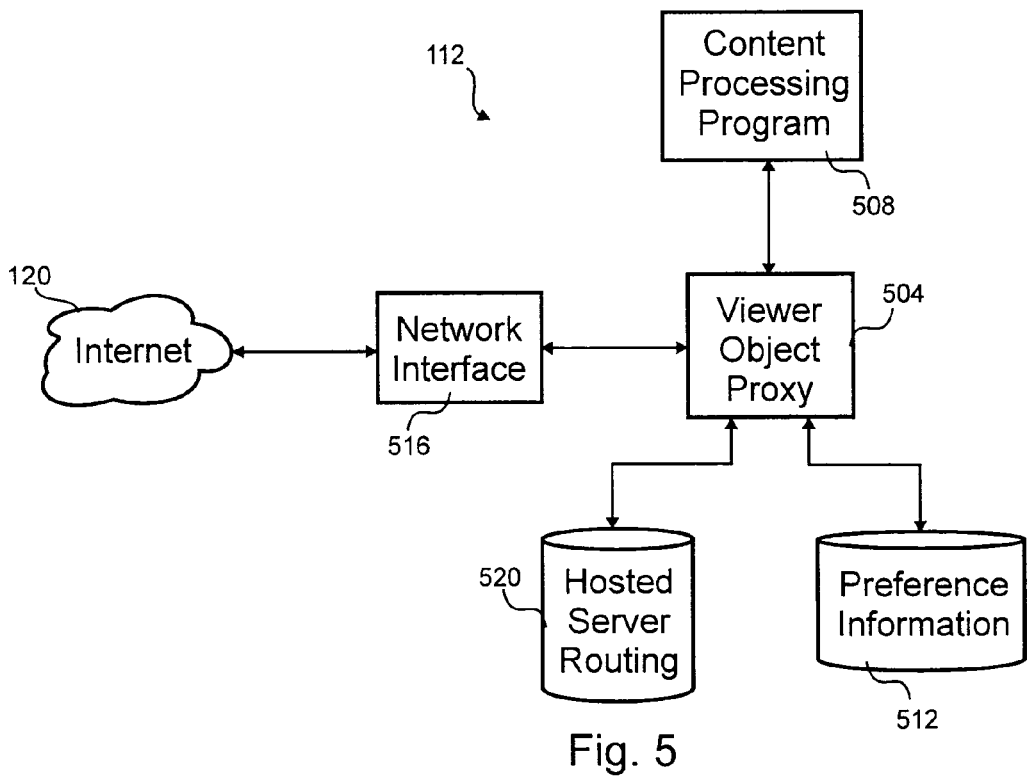
FIG. 5 is a block diagram of an embodiment of a client computer portion of the content distribution system.

Referring next to FIG. 5, a block diagram of an embodiment of a client computer portion 112 of the content distribution system 100 is shown. The client computer 112 communicates to the Internet 120 in order to deliver content to a user. Included in the client computer 112 are a viewer object proxy 504, a content processing program 508, preference information 512, a network interface 516, and hosted server routing 520.

The content processing program 508 is typically software that interprets or processes a content object downloaded from the Internet 120. Examples of content processing programs 508 include web browsers, file transfer protocol (FTP) software, gopher software, news (NNTP), mail programs, streaming media players, non-streaming media players, and other software. The Internet communication from content processing program 508 that is normally sent directly to the Internet is redirected to the viewer object proxy 504.

The viewer object proxy 504 serves as intermediary between the Internet 120 and the content processing program 508. After installation of the viewer object proxy 504, it determines its general location relative to known points on the Internet 120. Content exchanges 116 that are reasonable candidates for providing sufficient QOS are tested to determine the number of hops necessary and the latencies between each content exchange 116 and the viewer object proxy 504. A weighting of QOS factors, such as the number of hops and bandwidth achieved, is recorded as preference information 512 and is passed as meta-data to the content manager 312 in an HTTP header.

Other embodiments could pass meta-data in any sort of data channel and not just through a HTTP header. For example, the meta-data could travel through a dedicated port, an IP address, a URL, a header, or other logical channel.

The preference information 512 is the result of network analysis performed from the client computer perspective 112. When a content object is requested, the preference information 512 is communicated to the content object manager 312 which in turn selects an appropriate content exchange 116 for the client computer 112. Periodically, such as every hour, the preference information 512 is updated using automated tests or is updated manually by the user. Subsequent tests take into account the previous results to efficiently consider preferred content exchanges. For example, the first analysis may check one hundred content exchanges, but a subsequent analysis could eliminate the poor performing content exchanges such that only fifty are analyzed.

The preference information 512 includes a list of content exchanges 116 and their associated QOS values resulting from client-side network analysis. In some embodiments, there are multiple pathways to an external origin server 118. The multiple pathways are separated by port, IP address, server identification (ID), and/or other mechanisms. Client-side network analysis could be used to determine a QOS value associated with each pathway to an external origin server 118 or any source of a content object with multiple pathways.

After the user of the client computer 112 chooses a content object, the origin server name is provided to the viewer object proxy 504. The origin server name is used for the viewer object proxy 504 to query the dynamic DNS 204 for the IP address of the origin server 108. Once the IP address is known, the content processing program 508 is redirected to the content manager 312 for the desired content object. The content manager 312 is passed the preference information 512 to allow routing to the appropriate content exchange 116. In this embodiment, the preference information 512 includes the preferred ten content exchanges, but could be adjusted by the user.

In some embodiments, the viewer object proxy 504 can be HTTP-specific but protocol independent for routing information. Thus, routing information is transferred according to HTTP, but the actual routing information is protocol independent. However, one skilled in the art would recognize that the viewer object proxy 504 can also be configured to work with other network protocols as needed. For example, the viewer object proxy 504 can also be configured to operate in accordance with FTP, NNTP, RTP, RTSP, SMTP, or SHOUT etc.

The client computer 112 includes a host server routing 520 database. This host server routing 520 can include information related to external origin servers 118 accessible by the client computer 112. In an embodiment, host server routing 520 is a portion of the routing database 234 included in the active directory 104.

The client computer 112 includes a network interface 516 that connects the viewer object proxy 504 to the Internet 120. Common examples of network interfaces 516 include analog modems, DSL modems, ISDN, cable modems, satellite modems, cellular modems, etc.

In this embodiment, the client computer is associated with a home user. In other embodiments, the client computer could serve digital movies to a theater or provide content objects to a corporate network user, a hotel patron or apartment complex.

Figure 6:
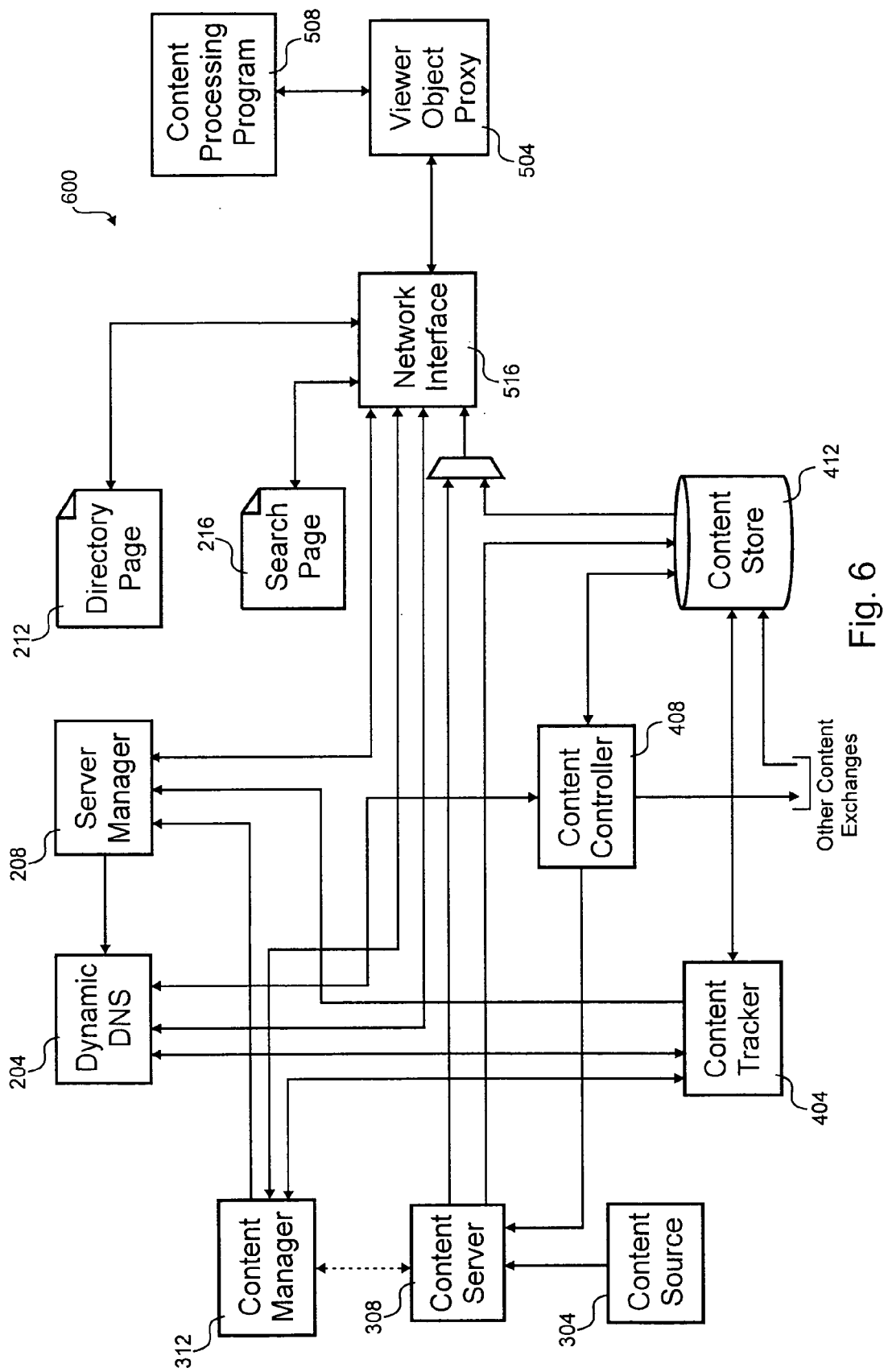
FIG. 6 is a block diagram of an embodiment of a content distribution system.

With reference to FIG. 6, a block diagram of an embodiment of a content distribution system 600 is shown. This figure depicts data flow between data blocks without showing transport over the Internet 120. It is to be understood, however, that the Internet 120 is used in some embodiments.

Also, the figure is somewhat simplified in that some blocks from FIGS. 2–5 and the external origin server(s) 118 and crawling directory 124 are not included to simplify the FIG. 6.

The network interface 516 is the connection to the Internet 120 for the client computer 112. The client computer 112 connects to the directory and search pages 212, 216 to allow the user to select content objects for download. When a content object is selected, redirection of the client computer 112 from the active directory 104 to the appropriate origin server 108 uses the dynamic DNS 204. Preference information 512 is passed to the content manager 312 to assist its selection of the source for the content object. Depending on the selection made by the content manager 312, the content object is downloaded from one of the content exchanges 116 or from the content server 308.

The active directory 104 interacts with the other modules in the system 600. The client computer 112 accesses the directory and search pages 212, 216 to select a content object. The content tracker 404 and content manager 312 respectively provide status and catalog information to the server manager 208. Account information is provided to the server manager 208 by the administrator of the origin server 108 and by the user of client computer 112 to maintain the subscriber database 224. Redirection from the origin server name to the IP address of the origin server 108 is provided to the viewer object proxy 504, the content tracker 404 and the content controller 408 by the dynamic DNS 204.

The origin server 108 communicates with the server manager 208, the client computer 112, the content tracker 404, the content store 412, and the content controller 408. The local content catalog 316 is provided to the server manager 208 from the content manager 312 in order to maintain the server database 228 with current content information. Preference information 512 is provided to the content manager 312 from the client computer 112 to facilitate selection of a source of the content object. The content tracker 404 interacts with the content manager 312 to know what content objects are stored on the content exchange 116. Content objects are read from the content server 308 by either the content store 412 or the client computer 112.

The content exchanges 116 interact with the other modules in the system 600 as well. Status information is provided to the active directory 104 and/or the content manager 312. The dynamic DNS is used by both the content controller 408 and the content tracker 404 to find the IP address of an origin server 108 that contains a content object. A selected content exchange may contact other content exchanges when an object is needed for the content store 412. If the other content exchanges do not have the content object, the content controller 408 requests the object from the content server 308 for delivery to the selected content store 412.

Figure 7A:
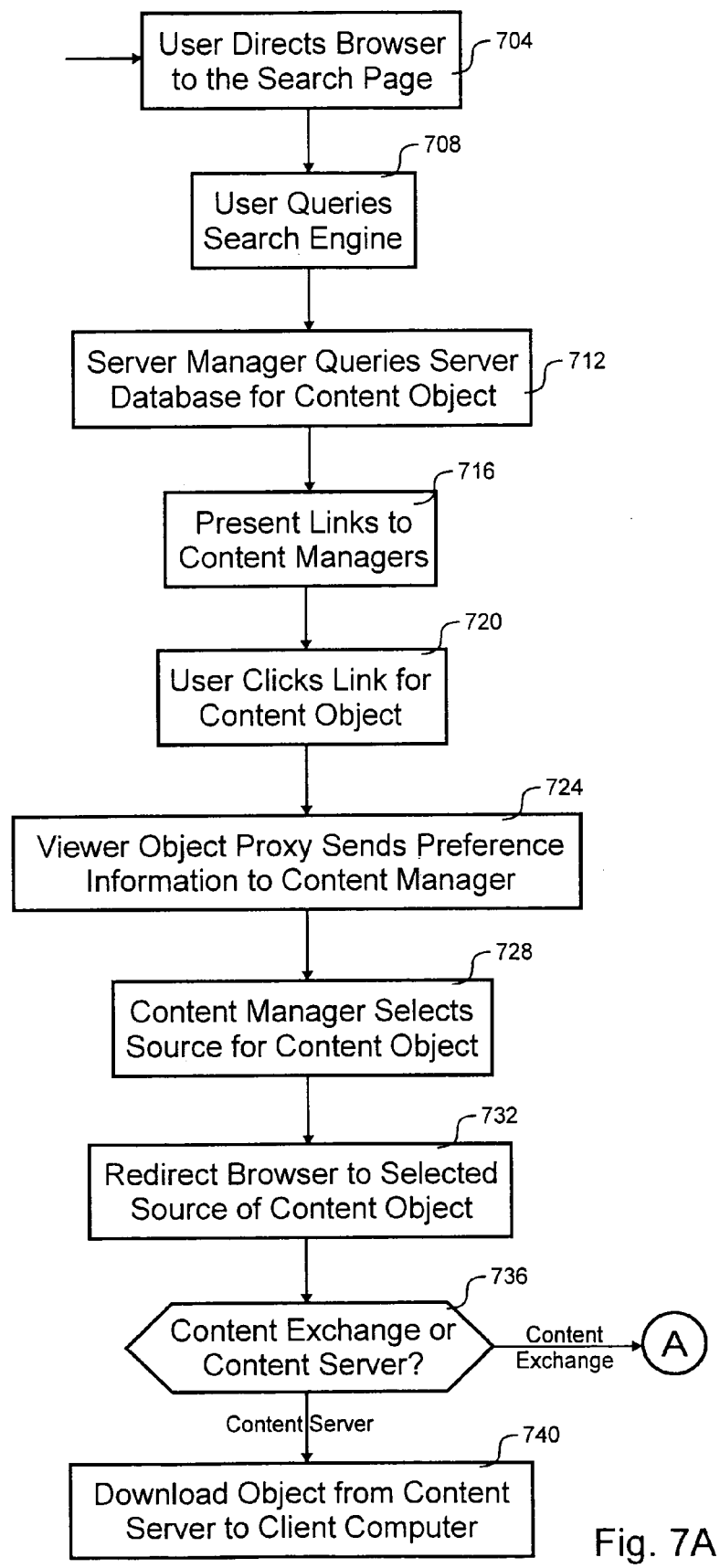
FIG. 7A is a first portion of a flow diagram of an embodiment of a process for distributing content to a user.
Figure 7B:
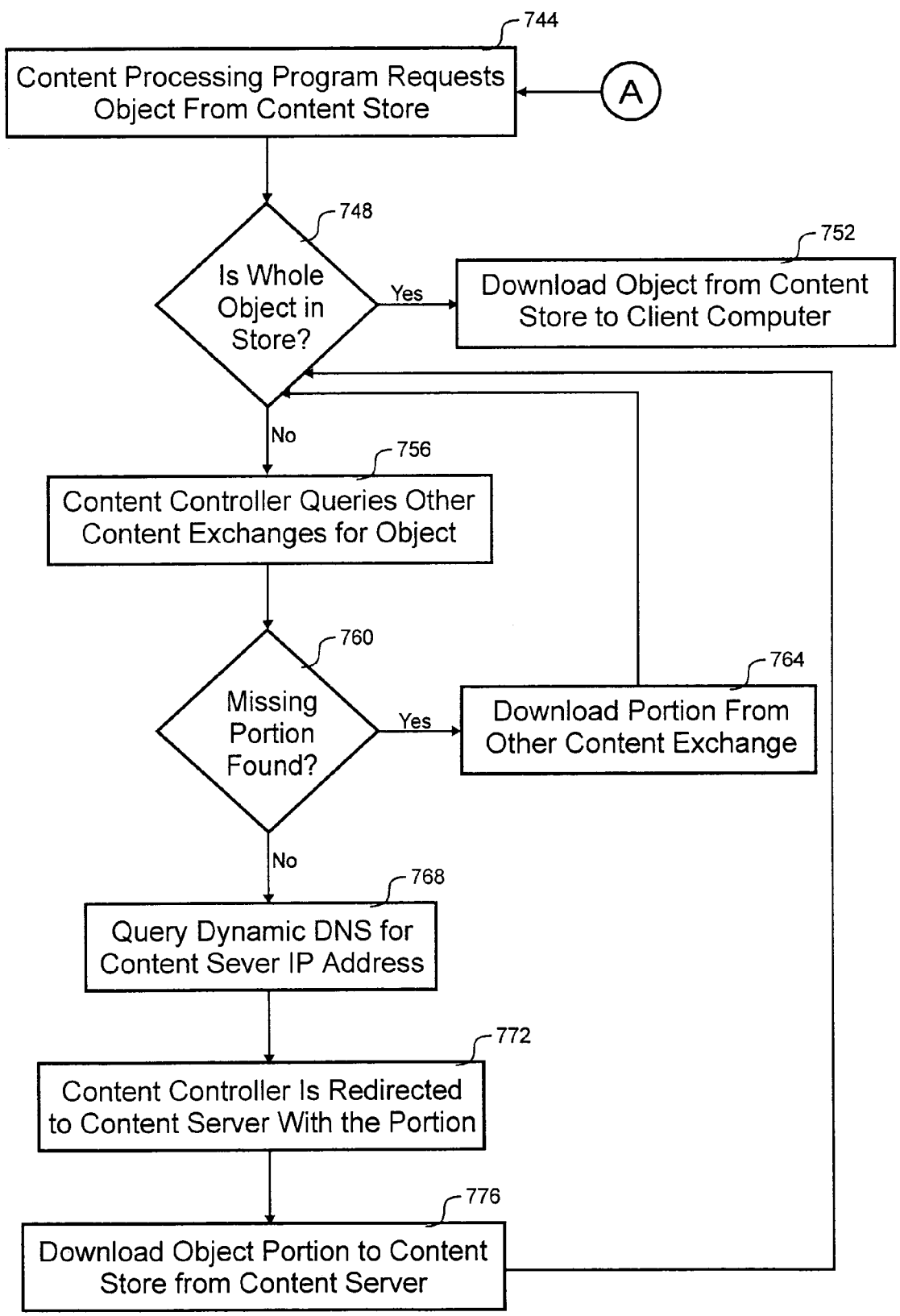
FIG. 7B is a second portion of the flow diagram of FIG. 7A.

Referring next to FIGS. 7A–B a flow diagram of an embodiment of a process for distributing content to a user is shown. Before the depicted process, the user and administrator respectively download and install software for the client computer 112 and origin server 108. The administrator chooses content on the content server for publishing to the system 600. To determine the preference information 512, the viewer object proxy 504 automatically interrogates nearby content exchanges 116 for adequate QOS.

The depicted process begins in step 704 where the user directs a web browsing content processing program 508 to the directory or search page 212, 216 of the active directory 104. In this embodiment, the user queries a search engine on the search page 216 using a boolean query in step 708 to find a content object. The search engine would search the server database 228 for hits and may also search a crawling directory 124 in step 712. Alternatively, the user could navigate the directory page 212 to find a desired content object.

The search or directory page 212, 216 presents links for each of the content objects that the user might select in step 716. Each link includes the origin server name 108, port, path and name for the content object. Given the choices available, the user may select one of the links corresponding to the desired content object in step 720. The dynamic DNS 204 is queried by the viewer object proxy 504 to determine the IP address of the origin server name from the link. Once the IP address is known, the content processing program is redirected to the IP address retrieved from the dynamic DNS 204 and the path and filename from the link.

Once the client computer 112 is connected to the content manager 312, the preference information 512 is forwarded to the content manager 312 in step 724. The content manager 312 analyzes the content location database 320, the preference information 512 and the status information to determine the source of the content object to redirect the client computer 112 to in steps 728 and 732.

A determination is made in step 736 as to whether the source is a content exchange 116 or the content server 308. The content server 308 may be chosen if the content manger 312 determines it can provide adequate QOS or superior QOS. In some embodiments, the content server 308 is only considered as a source if there are no content exchanges 116 that can provide adequate QOS. If the content server 308 is chosen, the origin server 108 provides the content object to the client computer 112 in step 740.

If the content manager 312 selects a content exchange 116 to host the content object request, the content processing program 508 is redirected to the chosen content store 412 and processing continues in step 744 of FIG. 7B. The content processing program 508 requests the content object in the link from the content store 412 in step 744. If the whole content object is in the content store 412, the object is downloaded from that content store 412 to the client computer in steps 748 and 752.

Alternatively, a whole copy of the content object is assembled in the content store 412 if any portion of the content object is missing. The building of the whole content object happens transparently to the user. In steps 756 and 760, the content controller 408 queries the other content exchanges 116 to determine which have the missing portion of the content object. The content object is reassembled in the content store 412 from beginning to end such that the beginning is available as soon as possible for download by the client computer 112.

In an iterative manner, the missing portions are retrieved from each content exchange 116 in step 764 until the whole content object is in the content store 412. If no other content exchange 116 has the missing portion of the content object, a query is made to the origin server 108 for the missing portion, in step 768. The dynamic DNS 204 is queried to determine the IP address of the origin server name for the content object. The content controller 408 is directed to the origin server 108 with the content object in step 772 by the dynamic DNS 204. The missing portion is downloaded from the content server 308 of that origin server 108 in step 776. Processing loops back to step 748 to retrieve any other missing portions.

This process of searching for portions continues in an interative manner until all missing portions are copied to the content store 412. Although this embodiment sequentially retrieves the missing portions, other embodiments could determine the location of the missing portions and retrieve them in parallel, in any order or in the order found.

Figure 8:
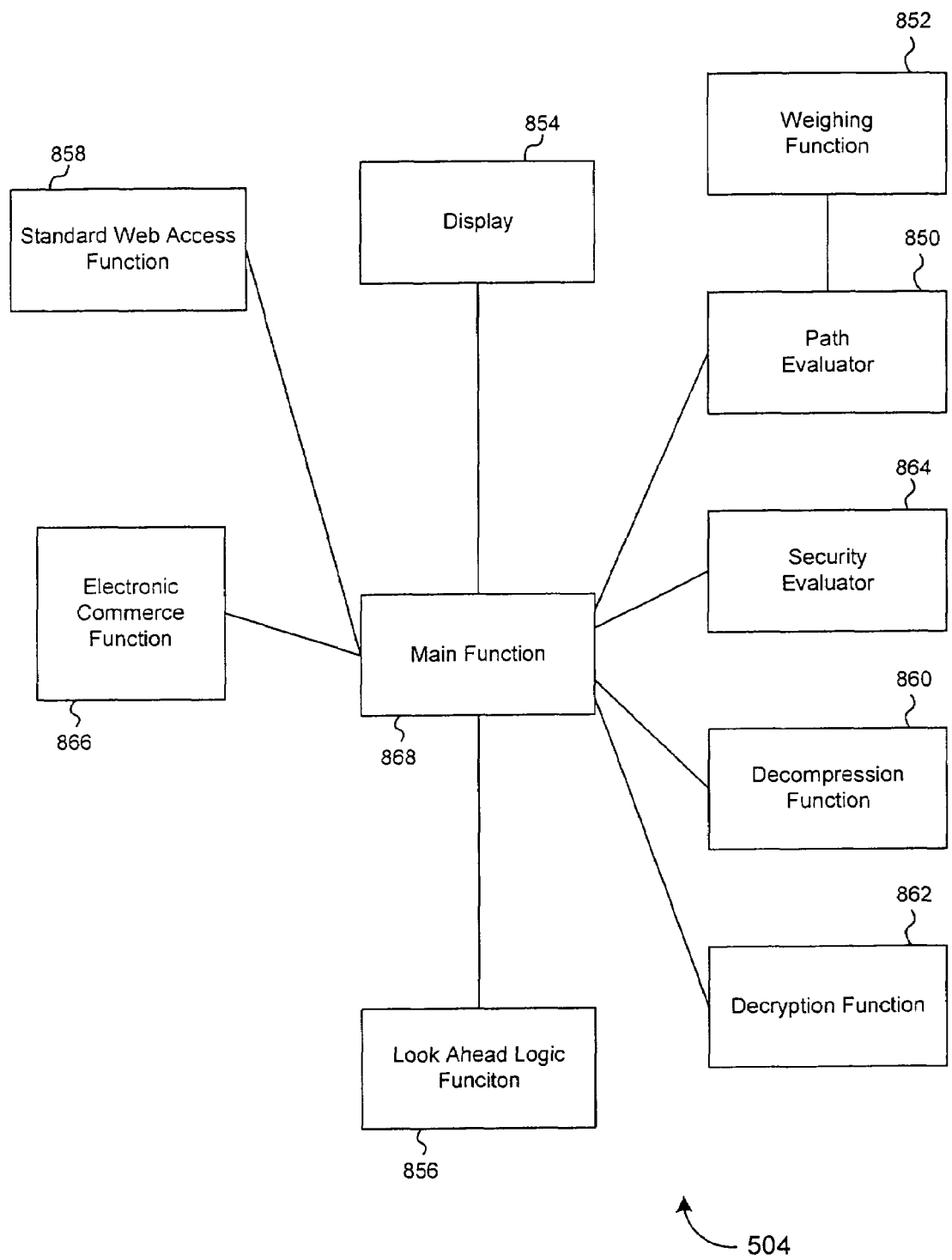
FIG. 8 is a block diagram of an embodiment of a viewer object proxy.

Referring now to FIG. 8, a block diagram of an embodiment of the viewer object proxy 504 is shown. The viewer object proxy 504 includes the following functions: a path evaluator 850, a weighting function 852, a display function or routine 854, a look ahead logic function 856, a standard web access function 858, a decompression function 860, a decryption function 862, an electronic commerce function 866, a security function 864, and a main function 868 which interfaces the various other functions in the viewer object proxy 504. It should be recognized that the preceding list of possible functions included in the viewer object proxy 504 is merely illustrative and that one skilled in the art would recognize other functions relevant to the viewer object proxy 504.

Because the viewer object proxy 504 is a proxy with all viewer requested content objects flowing through it, a look ahead logic function 856 can be implemented. In an embodiment, the look ahead logic function 856 anticipates the user's next browse or move and fetches the related browse information for storage on the client computer 112 before an actual request by the user. The pre-fetched information is retained until the information is actually requested by the user. If the look ahead logic function 856 incorrectly anticipates the user's next browse, the pre-fetched data is discarded. As an example, the look ahead logic function 856 performs a pre-fetch of a commonly accessed page lower in the hierarchy of the directory page 212 (as described with reference to FIG. 2). By pre-fetching information, the look ahead logic function 856 is able to reduce access latency.

In some embodiments, the decompression function 860 and the decryption function 862 are provided. These functions 860, 862 provide capability to decompress and decrypt information received from either an origin server 108, a content exchange 116, an external origin server 118, or any other server on the Internet 120.

For any user request, the viewer object proxy 504, based on availability of the decompression 860 and decryption 862 functions, can negotiate the form of compression and encryption that will be used during a content object transfer with a server on the Internet 120. Thus, anytime a user is surfing the Internet 120, the viewer object proxy 504 tells any contacted server what compression and encryption are supported. This does not require contacted servers to have special software, but QOS can be increased where a contacted server supports the same compression, encryption and security functions supported by the viewer object proxy 504. It should be recognized that many communication mechanisms can be used to decompress and decrypt. For example, FTP, NNTP, RTP, RTSP, or SMTP could be used.

In an embodiment, decryption and decompression negotiation is accomplished by way of HTTP. More specifically, the negotiation is achieved via an extended HTTP header.

Further, in some embodiments, it is possible for the user to disable either or both the decompression function 860 and the decryption function 862. If the respective functions 860, 862 are disabled by the user, the viewer object proxy 504 will not negotiate for use of the disabled function.

In some embodiments, the viewer object proxy 504 includes the security function 864. The security function 864 operates to permit or deny access when appropriate. More specifically, the security function 864 provides control such that content objects will be decrypted only if authority is given by a trusted system. For example, a trusted system may only provide authority to accept and/or decrypt data where a specific dongle type hardware device is attached to the client computer 112 and the attachment condition is reported by the security function 864 via the viewer object proxy 504.

In some embodiments, the viewer object proxy 504 includes the electronic commerce function 866. The electronic commerce function 866 can be integrated tightly with an electronic commerce engine resident on the Internet 120. By way of the electronic commerce function 866, users are provided a mechanism for purchasing content objects. For example, token credits stored in the subscriber database 224 could be credited to origin servers 108 to download content objects.

In addition, the viewer object proxy 504 can include the standard web access function 858 which provides access to Internet domains residing outside of the content distribution system 100. In an embodiment, when the viewer object proxy 504 receives a user request from the content processing program 508 for a content object sourced by a domain outside the content distribution system 100, the standard web access function 858 determines if the content object was previously saved on the client computer 112. If the requested content object was previously saved, the saved content object is returned by the standard web access function 858 to satisfy the user request. If the requested content object was not previously saved, the user request is passed on by the standard web access function 858 and the content object is retrieved as if the content processing program 508 had accessed the Internet 120 directly.

Figure 9:
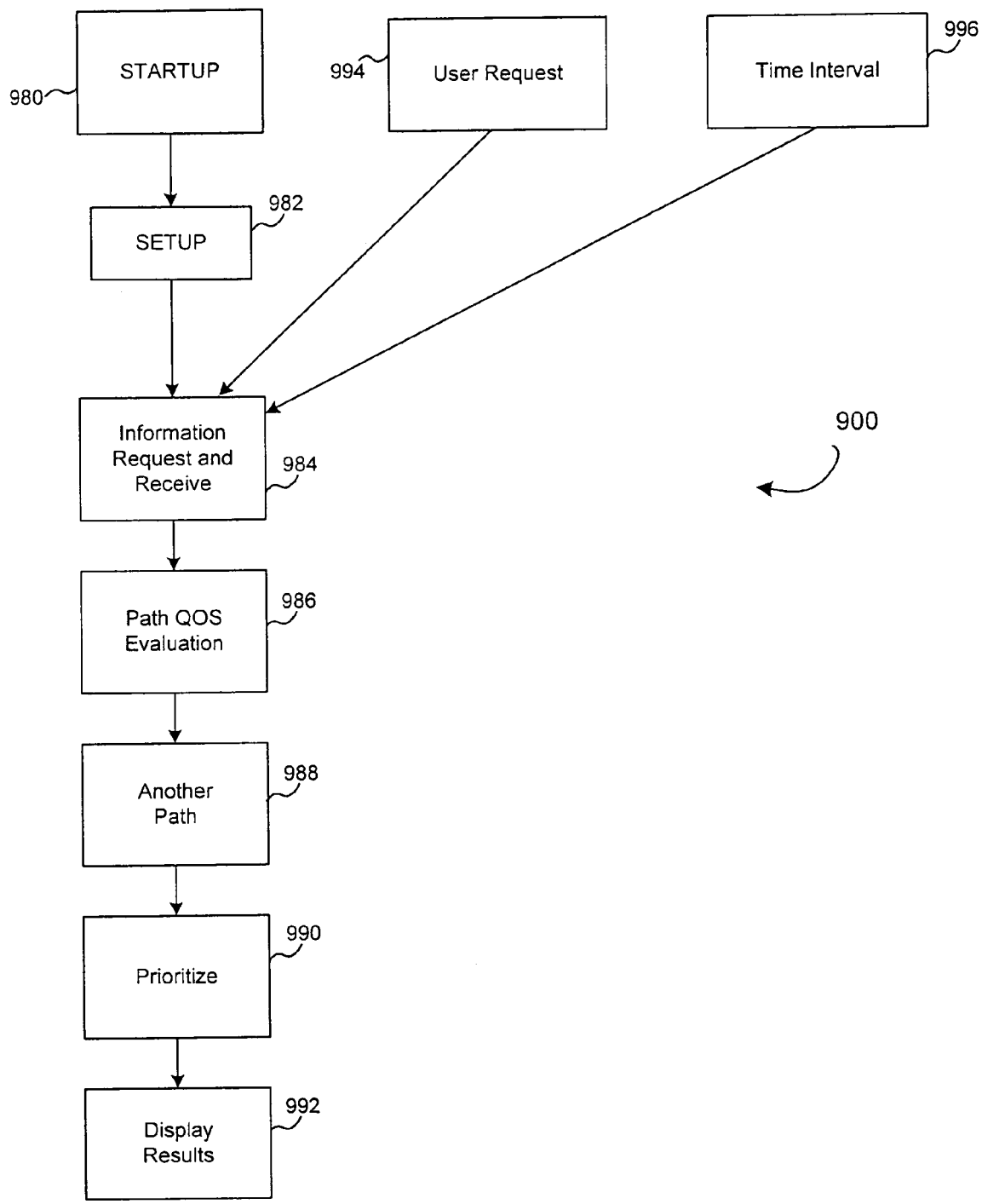
FIG. 9 is a flow diagram of a viewer object proxy background application.

The path evaluator 850, weighting function 852 and display function or routine 854 are described in relation to a flow diagram of a viewer object proxy background application 900 included as FIG. 9. The background application 900 utilizes various viewer object proxy 504 functions to determine desirable content exchanges 116 capable of providing sufficient QOS to the client computer 112. The desirable content exchanges 116 are stored in memory as preference information 512 and subsequently communicated to the content object manager 312.

Referring to FIG. 9, a setup 982 is performed at startup 980 and the display routine 854 is launched. The setup 982 can include requesting and initializing graphics memory in the client computer 112, initializing a proxy, and launching the display routine 854. Further, setup 982 may include any processes for initializing a graphics display or a proxy.

Following setup 982, an information request and receive 984 is performed. During information request and receive 984, the content exchange database 232 from the active directory 104 is downloaded to the client computer 112. As mentioned above, content exchange databases 232 can be regionalized or partitioned by a variety of methods including, but not limited to, improved QOS criteria or subscription services criteria. Thus, in some embodiments, information request and receive 984 results in retrieval of a content exchange database 232 containing only content exchanges 116 geographically proximate to client computer 112. As an example, a retrieved content exchange database 232 may include only content exchanges 116 located in North America. In other embodiments, information request and receive 984 results in retrieval of a content exchange database 232 containing only content exchanges 116 which support a particular subscription service or which are attributed to a particular provider. Alternatively, the content exchange database 232 could be limited to content exchanges that are attributed to a particular Internet Service Provider, or that support a particular protocol, or even that provide content objects in a particular language. In yet other embodiments, information request and receive 984 results in retrieval of a content exchange database 232 containing all possible content exchanges 116.

In some embodiments, information request and receive 984 further includes requesting and receiving some portion of the routing database 234 which includes routing information for external origin servers 118. The received portion of routing database 234 is stored to memory in the client computer 112 as hosted server routing 520.

Among other uses, information provided through information request and receive 984 can be used to generate a display for the user. For example, in some embodiments, the location coordinates and icon information provided as part of the content exchange database 232 can be used as part of a graphical presentation provided to the user via the display function or routine 854. The graphical presentation could show the user what is available on the content distribution system 100 or elsewhere on the Internet 120. Further, the graphical presentation could show various paths from the client computer 112 to multiple content exchanges 116. In a particular embodiment, physical locations of content exchanges 116 and origin servers 108 are superimposed on a world map which is displayed to the user.

Beyond using the content exchange database 232 by the display function 854, information from the content exchange database 232 can be used to perform a path QOS evaluation 986. More specifically, QOS for paths between the client computer 112 and each content exchange 116 or node specified in the content exchange database 232 can be determined and stored in memory in the client computer 112.

It should be recognized that receiving a list of content exchanges 116 through information request and receive 984 is illustrative of a method for determining potential content exchanges 116. In alternative embodiments, one could obtain a list of possible content object sources, such as content exchanges 116, external origin servers 118 and origin servers 108, or by using a list compiled by the viewer object proxy 504. The list could be based on knowledge of the viewer object proxy 504 obtained during earlier content object transfers inside or outside of the content distribution system 100.

In an embodiment, the path QOS evaluation 986 is performed for paths associated with all content exchanges 116 listed in the content exchange database 232. To start, a path associated with the first content exchange 116 listed in the content exchange database 232 is analyzed. Next, in step 988, a determination is made if another content exchange 116 is provided in the content exchange database 232. If another content exchange 116 is provided, the path to the content exchange 116 is evaluated. This process continues until the path QOS evaluation 986 is performed for all content exchanges 116 listed in the content exchange database 232. It should be recognized that path QOS evaluation could be performed on any content object source or transfer node and is not necessarily limited to evaluating content exchanges 116 and origin servers 108. It should be understood that a transfer node can be a content exchange 116 or other server capable of storing and transferring content objects. It should be recognized that as it is used, in relation to path QOS evaluation, the term path incorporates routing.

In other embodiments, only a subset of the content exchanges 116 listed in the content exchange database 232 are evaluated. Evaluating only a subset of content exchanges 116 from the content exchange database 232 provides more efficient path QOS evaluation 986. This increased efficiency can be achieved where it is known that certain content exchanges 116 are unlikely to provide sufficient QOS and are thus not worth evaluating. Thus, for example, where the client computer 112 is in North America and it is perceived that content exchanges outside North America are unlikely to provide sufficient QOS, path QOS evaluation 986 is only performed for content exchanges 116 located in North America.

Alternatively, a site based path QOS evaluation 986 can be performed where it is perceived that different types of content exchanges 116 are likely to provide similar service. More specifically, one content exchange 116 associated with each content exchange site 432 represented in the content exchange database 232 is evaluated. From this, it can be determined which content exchange sites 432 are likely to provide sufficient QOS. Subsequently, content exchanges 116 associated with the content exchange sites 432 determined likely to provide sufficient QOS are each individually analyzed. In this way, content exchanges 116 associated with content exchange sites 432 unlikely to provide QOS are not evaluated.

In another embodiment, the path QOS evaluation 986 only for content exchanges 116 that support particular protocols. Or, alternatively, path QOS evaluation 986 may only be performed for content exchanges 116 at a content exchange site 432 where a particular protocol is supported by at least one content exchange 116 at the site 432.

Further, in some embodiments, path QOS evaluation 986 is performed only once for a particular content exchange 116. Thus, where a particular content exchange 116 has multiple IP addresses, ports or names, path QOS evaluation 986 is only performed for one IP address, port or name. This eliminates redundant evaluation during path QOS evaluation 986. However, it should be recognized that path QOS evaluation 986 could be performed for multiple IP addresses, ports or names for the same content exchange 116 where it is perceived that a different QOS is possible.

Selecting which subset of content exchanges 116 in the content exchange database 232 to evaluate can be based on a criteria supplied by the client computer 112 and based on client computer experience, by the active directory 104, by a content exchange 116, origin server 108, and/or a user.

In an embodiment, path QOS evaluation 986 is accomplished using a combination of network analysis methodologies including, but not limited to, traceroute, bandwidth test via file transfer, server health check, server load/resource check, ping, path difference, Border Gate Protocol (BGP) routing information, and port response time.

Traceroute includes any analysis which returns a route that packets take between a particular content exchange 116 and the client computer 112. Typically, traceroute returns the number of hops traversed, the IP addresses of traversed hops, and the time required by a traverse between the client computer 112 and the content exchange 116.

Bandwidth test via file transfer includes any analysis where a bulk information transfer is performed between the content exchange 116 and the client computer 112. During the bulk transfer, various indices of performance are derived including, but not limited to, the time required to perform the bulk transfer. Typically, data transferred between the content exchange 116 and the client computer 112 is highly random. The random nature of the data reduces the impact of any compression occurring between the client computer 112 and the content exchange 116.

Ping includes any analysis where information is sent by the client computer 112 to a particular content exchange 116 and the client computer 112 awaits a response from the content exchange 116. Typically, ping is performed via UDP or any other lossy protocol (i.e. a protocol which does not guarantee a response). Ping is useful to verify whether the content exchange is operational. Alternatively, the time required to receive the reply can be used as an indication of QOS.

Server health check and server load/resource check can include any analysis which determines various heuristics related to the health, loading and available resources of a content exchange 116, origin server 108, or other transfer node. In general, a content exchange 116 is queried to determine various operating characteristics including, but not limited to: an average and peak CPU load, a CPU temperature, a number of pages transferred between the hard drive and RAM to resolve cache misses, a rate at which the content exchange 116 is issuing read and write operations to the hard drive, a number of requests the content exchange 116 is currently servicing, an average number of users accessing the content exchange, a number of concurrent connections, a rate of inputs and outputs to/from the content exchange 116, an average size of a content object requested from the content exchange 116, a size of a local memory, including RAM and hard drive memory, associated with the content exchange 116, an average content object size included in the local memory, a number of content objects included in the local memory, an average time a content object remains in the local memory, a rate of instances a content object is not found in the local memory, and any other error indications and/or status information.

The aforementioned heuristics can be determined using the health check 330, 426 associated with a particular content exchange 116 or origin server 108. In an embodiment, health check 330, 426 are software applications running on a content exchange 116 and origin server 108 respectively. When queried by the viewer object proxy 504, the health check 330, 426 may provide a CPU load, a CPU temperature, a number of concurrent connections, and a number of requests the content exchange 116 or origin server 108 is currently servicing. In some embodiments, viewer object proxy 504 queries the content object exchange 116 via HTTP to retrieve server health check heuristics. It should be noted, however, that one skilled in the art would recognize many mechanisms for accessing server health heuristics including, but not limited to, FTP, NNTP, RTP, RTSP, SHOUT, SMTP, or connecting to the node through a designated port.

In other embodiments, a request for status by the viewer object proxy 504 to the health check 330, 426 results in a single status indicia being returned. The single status indicia is between one and zero with one indicating poor characteristics and zero indicating good characteristics. Good and poor characteristics are determined based on the ability or capability for a content exchange 116 or other transfer node to act as a content object cache. Thus, in an embodiment, an indicia of 0.9 indicates an inability to maintain a content object local to a content exchange 116 for an extended time. Alternatively, an indicia of 0.2 indicates an ability to maintain a content object for an extended time.

To determine the single status indicia, many machine characteristics can be monitored and combined. In an embodiment, the single status indicia includes the following characteristics in combination: an average CPU load, a size of a local memory associated with the content exchange 116, an average content object size included in the local memory, and an average time a content object stays in the local memory. The combination of these individual characteristics serve to rate the ability of the content exchange to act as a content object cache. To combine the characteristics into a single indicia, each of the characteristics is first normalized to a percentage of a predetermined use level. The normalizing is performed such that 100% indicates the best possible characteristic value and zero indicates the worst characteristic value. Then the normalized values are multiplied by a predetermined percentage of the overall status indicia and the multiplied values are aggregated to create a single indicia between one and 0. It should be recognized that a number of alternative sets of characteristics can be used to form a single indicia. For example, an embodiment could combine an average CPU load, a CPU temperature, an average number of users connected to the source, and a rate of inputs and outputs to/from a content exchange to form the single indicia.

The following provides an example of forming the single indicia where: a CPU load of 90% of maximum, an average size of a content object normalized to 20%, a size of a local memory normalized to 30%, included in the local memory, an average content object size included in the local memory normalized to 80%, and an average time a content object stays in the local memory normalized to 50% are found. These normalized values can be aggregated such that each of the characteristics plays an equal role in the single indicia. Thus, each of the normalized values are multiplied by 20% and subsequently aggregated to create the single indicia. Accordingly, the single indicia in the example is 54% or 0.54. It should be recognized that the example and embodiment are merely illustrative and that a number of alternative methods for combining multiple characteristics into a single indicia are possible.

BGP routing information includes any information returned as a result of a Border Group Protocol analysis. In general, this information is related to path topology and includes, but is not limited to an Autonomous System (AS) Path Attribute, and AS Next Hop.

Path difference includes any analysis which determines a bandwidth or latency difference between alternative paths connecting the content exchange 116 and the client computer 112.

Port response time includes any analysis which provides an indication of port response. In general, the test provides information related to the response time of a content exchange 116 port. For example, port time can include any analysis where the time required to transfer a zero length message is determined. Typically, the result of a zero length transfer is reported as the number of exchange messages per second. The number of exchanges per second can be used to infer content exchange 116 latency.

It should be recognized that any of the aforementioned methodologies may be combined to provide an indicator of QOS or transmission quality for a path connecting a content exchange 116 and the client computer 112. Alternatively, any of the aforementioned methodologies may be combined with other network analysis methodologies to provide QOS evaluation 986. For example, in an embodiment, ping, traceroute and health check are used in combination to provide a QOS evaluation.

In another embodiment, all of the aforementioned methodologies are combined to determine QOS. To determine QOS, each of the methodologies is performed and a QOS factor for each methodology is returned. The QOS factors from each of the methodologies are then normalized and aggregated to form a single QOS factor for each analyzed path. Normalizing the QOS factors can be done by equally weighting each of the methodologies.

For example, in an embodiment, the following normalizing and aggregation occurs where: (1) traceroute returns 9 hops, (2) bandwidth test via file transfer returns 300 msec, (3) server health check returns a one for healthy, (4) server load/resource check returns 65% average CPU load, (5) BGP routing information returns four hops, and (6) port response time returns 45 msec. Also, each of the returned values is compared to a respective predetermined maximum value such as: (1) thirty hops for traceroute, (2) 500 msec for bandwidth test via file transfer, (3) one for server health check, (4) 100% for server load/resource check, (5) six hops for BGP routing information, and (6) 100 msec for port response time.

To normalize and aggregate, each of the returned values are divided by their respective predetermined maximum. Thus, traceroute yields 0.33, bandwidth test via file transfer yields 0.6, server health check yields 1, server load/resource check yields 0.65, BGP routing information yields 0.75, and port response time yields 0.45. Next all of the normalized values are aggregated to provide 3.78 as an overall QOS factor. This QOS factor is then used to compare between various content exchanges 116.

In other embodiments, values returned from each of the methodologies are disparately weighted prior to aggregation. Weighting factors can be provided by a user to affect the QOS factor returned. Such an embodiment is described using the values from the previous illustration where the normalized values returned from the various methodologies are: (1) 0.33 for traceroute, (2) 0.6 for bandwidth test via file transfer, (3) one for server health check, (4) 0.65 for server load/resource check, (5) 0.75 for BGP routing information, and (6) 0.45 for port response time. Continuing the illustration the following weighting factors are used: one for traceroute, three for bandwidth via file transfer, one for server health check, four for server load/resource check, one for BGP routing information, and three for port response time are used. Each of the normalized values are multiplied by their respective weighting factor to yield: (1) 0.33 for traceroute, (2) 1.8 for bandwidth test via file transfer, (3) one for server health check, (4) 2.6 for server load/resource check, (5) 0.75 for BGP routing information, and (6) 1.35 for port response time. Next, the weighted normalized values are aggregated to provide 7.83 as an overall QOS factor. Again, this QOS factor is used to compare between various content exchanges 116.

In addition to providing the weighting factors, the user can manually select a preset order of content exchanges 116, or provide only a single acceptable content exchange 116 either of which effectively overrides the automated analysis of path QOS evaluation 986. Thus, a user can achieve any desired result by either allowing fully automated generation of QOS factors for content exchanges 116, by manually weighting the path QOS evaluation 986 to effect QOS factors returned for content exchanges 116, or by overriding the automatic analysis and providing a list of desired content exchanges 116.

In some embodiments a multi-tiered path QOS evaluation 986 can be performed by using a subset of the aforementioned methodologies to perform a coarse QOS analysis followed by a fine QOS analysis on a limited number of content exchanges 116. This multi-tiered analysis increases efficiency of path QOS evaluation 986 by avoiding fine QOS analysis of content exchanges unlikely to provide sufficient QOS. Accordingly, in an exemplary embodiment, both ping and traceroute are applied to perform coarse QOS analysis for all content exchanges 116 included in content exchange database 232. Subsequently, a pre-determined number of content exchanges 116, preferably less than twenty-five, which provide sufficient QOS according to coarse QOS are evaluated using server health check as the fine QOS analysis. Results of the fine QOS analysis define the content exchanges 116 which provide sufficient QOS. It should be recognized that any combination of methodologies can be applied to perform either fine or coarse QOS analysis. Alternatively, it should be recognized that either fine or coarse QOS analysis can themselves involve multi-tiered analysis.

After path QOS evaluation 986 is performed for potential paths and a QOS factor for each evaluated path is stored in memory of the client computer 112, the content exchanges 116 associated with the evaluated paths are prioritized 990. Content exchanges 116 are prioritized based upon the QOS factor determined in path QOS evaluation 986. Based on the QOS factor, a predetermined number of content exchanges are chosen, ranked and stored as preference information 512. In an embodiment, the preference information 512 includes the preferred ten content exchanges 116.

As disclosed above, in alternative embodiments, one could perform path QOS evaluation on any content object source, not necessarily just content exchanges 116 and origin servers 108. In this case, the preference information 512 could include content object sources, origin servers 108, as well as content exchanges 116.

Preference information 512 includes a list of content exchanges 116 which provide sufficient QOS as determined by network analysis performed from the client computer's 112 perspective. By analyzing QOS from the client computer's 112 perspective, QOS can be improved.

In some embodiments, preference information 512 is used to form a subset of content exchanges 116 to be analyzed by path QOS evaluation 986. For example, content exchanges 116 may be tested that exist at the same site or are associated with the same provider as content exchanges 116 included in the preference information 512. Thus, only content exchanges 116 that are most likely to provide sufficient QOS are re-evaluated in subsequent path QOS evaluation 986. Alternatively, content exchanges 116 included in the preference information 512 can be analyzed by path QOS evaluation 986 along with other content exchanges 116 that have been added to the content exchange database 232 since the last creation of the preference information 512. In these ways, experience of the viewer object proxy 504 can be used to effectuate a more efficient path QOS evaluation 986. It should be recognized that the preceding embodiments are merely illustrative and that many algorithms exist for selecting content exchanges 116 to increase efficiency of path QOS evaluation 986. For example, prior operation of path QOS evaluation 986 may have returned sufficiently poor results for a particular content exchange 116, that it is never again analyzed, but rather presumptively rejected. In some embodiments, this presumptive rejection can be manually overridden by the user.

Results of path QOS evaluation 986 can be displayed 992 for the user. In some embodiments, the results are displayed both to entice a user to keep the viewer object proxy 504 application running on the desktop of the client computer 112 and to aid the user in modifying the weighting function 852 to manually control content exchange 116 selection. In an embodiment, the display function 854 provides, among other things, a regional map illustrating hops between the client computer 112 and a selected content exchange 116 along with statistics describing operating characteristics.

In addition to updating preference information 512 at startup 980, the preference information 512 can be updated either at the users request 994 or based upon a time interval 996. In an embodiment preference information 512 is updated at time interval 996, which is set at 3600 seconds.

In addition to the background application described in relation to FIG. 9, the viewer object proxy 504 can provide foreground operations including, but not limited to, servicing user requests for content objects from the content distribution system 100, the external origin servers 118, and the Internet 120 along with servicing electronic commerce requests. More specifically, the viewer object proxy 504 can handle electronic commerce requests as previously described in relation to the electronic commerce function 866.

Figure 10:
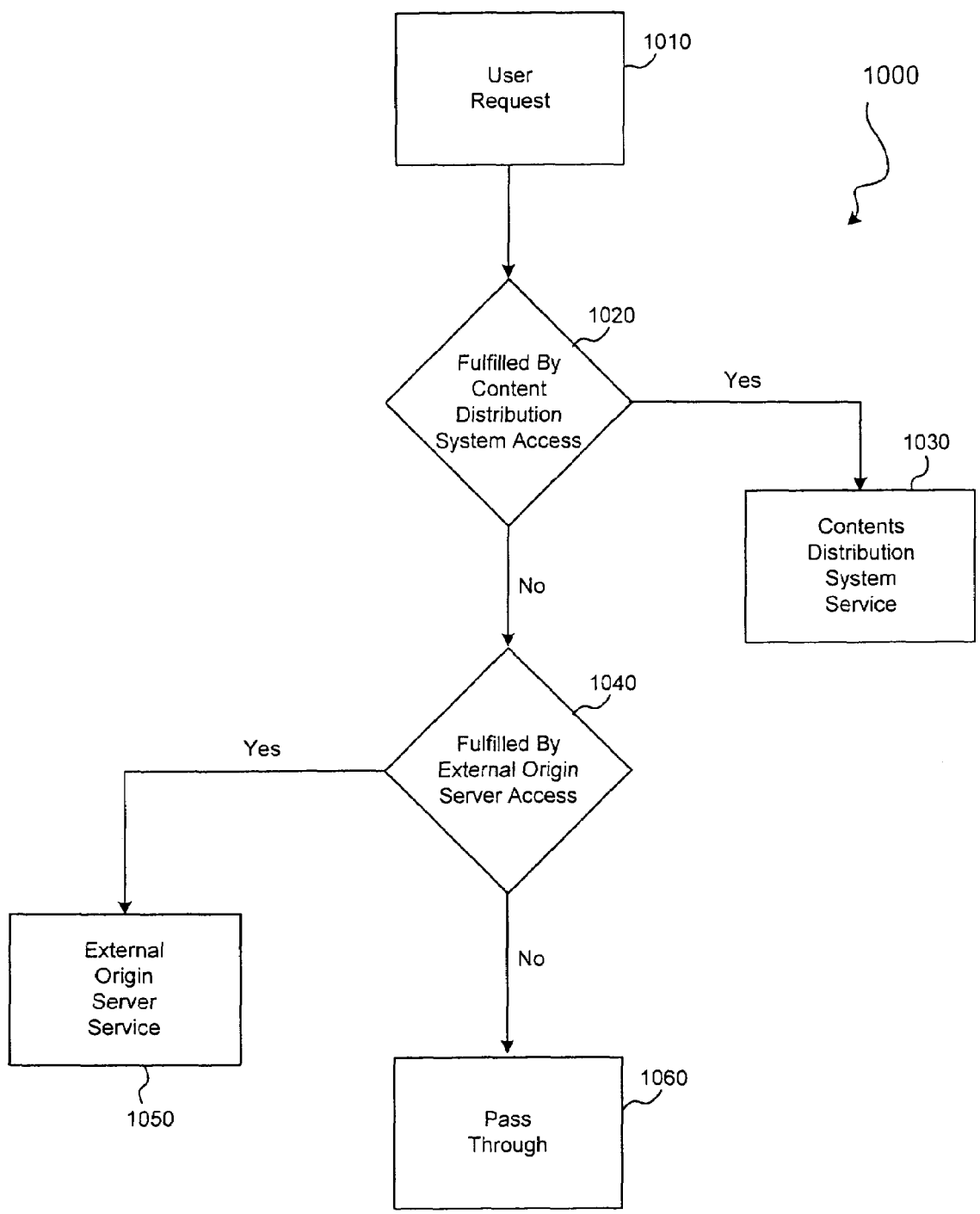
FIG. 10 is a flow diagram of a viewer object proxy request servicing.

Accessing content objects from the content distribution system 100, external origin servers 118 and the Internet 120 are described in relation to a flow diagram of an embodiment of a viewer object proxy request servicing 1000 included as FIG. 10. Referring to FIG. 10, a the user request 1010 for a content object is received by the viewer object proxy 504. In an embodiment, the content distribution system 100 is accessed through the content processing program 508. More specifically, the content processing program 508, in reaction to a user command, issues a request for a content object. The request for a content object is passed to the viewer object proxy 504 as the user request 1010.

Upon receiving the user request 1010, viewer object proxy 504 determines if the received the user request 1010 can be fulfilled by content distribution system access 1020. In an embodiment, this determination is done by comparing a source location of the user request 1010 with a known list of source locations associated with the content distribution system 100. If the source location of the user request 1010 matches a source location associated with the content distribution system 100, the request can be fulfilled by content distribution system access 1020. Accordingly, content distribution system service 1030 is performed to fulfill the user request 1010.

In some embodiments, the viewer object proxy 504 performs content distribution system service 1030 by communicating the preference information 512 to an origin server 108. Using the preference information 512, the origin server 108 selects a content exchange 116 or origin server 108 that can provide sufficient QOS for the user request 1010. The origin server 108 then communicates the address of the selected content exchange 116 or origin server 108 to the viewer object proxy 504. In an embodiment the origin server 108 dynamically writes HTML to provide viewer object proxy 504 with the address of the selected content exchange 116 or origin server 108. Next the viewer object proxy 504 negotiates compatible compression, encryption and security with the selected content exchange 116 or origin server 108. In an alternate embodiment, the viewer object proxy 504 could itself select the content exchange 116 to provide a requested content object by using the preference information 512.

The viewer object proxy 504 fulfills the user request 1010 by requesting content objects from the selected content exchange 116 or origin server 108. As the requested content object is received, decompression, decryption and security are provided by the viewer object proxy 504 according to the negotiated format. Thus, by passing client computer 112 specific information to the origin server 108, the origin server 108 is able to select a content exchange 116 capable of providing sufficient QOS. By providing analysis and content exchange selection from the client computer 112 perspective, more accurate QOS analysis is achieved resulting in better QOS.

If the user request 1010 cannot be fulfilled by content distribution system access 1020, the viewer object proxy 504 next determines if the user request 1010 can be fulfilled by external origin server access 1040. In an embodiment, this determination is done by comparing a domain name indicated in the user request 1010 with domain names for external origin servers 118 provided in hosted server routing 520. If the domain name indicated in the user request 1010 matches a domain name of an external origin server 118, the user request 1010 can be fulfilled from the matched external origin server 118 by performing external origin server service 1050. Accordingly, external origin server service 1050 is performed to fulfill the user request 1010. In other embodiments, the user request 1010 may include a directory name, a machine name, an IP address, or another identifier which is compared with a corresponding identifier for external origin servers included in hosted server routing 520.

In an embodiment, the viewer object proxy 504 performs external origin server service 1050 by accessing a content exchange 116 known to provide content objects sourced from the matched external origin server 118. Thus, the viewer object proxy 504 redirects the user request 1010 from the matched external origin server 118 to the content exchange 116. This redirection is transparent to both the matched external origin server 118 and to the content processing program 508. In some embodiments, the viewer object proxy 504 negotiates compatible compression, encryption and security with the selected content exchange 116. In turn, the content exchange 116 fulfills the user request 1010 according to the negotiated compression, encryption and security. In instances where the content exchange 116 does not have the requested content object, the content exchange 116 requests the desired content object from the matched external origin server 118. In either case, the requested content object is provided to the client computer 112 by the content exchange 116. As the requested content object is received, decompression, decryption and security are provided by the viewer object proxy 504 according to the negotiated format. Thus, by servicing user requests 1010 from content exchange 116, a content object provider maintaining an external origin server 118 is not burdened with distributing content objects.

In an alternate embodiment, the viewer object proxy 504 could perform external origin server service 1050 by communicating preference information 512 to an origin server 108. Using the preference information 512, the origin server 108 selects a content exchange 116 or an origin server 108 that can provide sufficient QOS for the user request 1010. The origin server 108 communicates an address to the selected content exchange 116 or origin server 108 to the viewer object proxy 504.

The viewer object proxy 504 then fulfills the user request 1010 by requesting content objects from the selected content exchange 116 or origin server 108. The selected content exchange 116 or origin server 108 requests the desired content object from the matched external origin server 118 and subsequently fulfills the user request 1010 by providing the requested content object to the viewer object proxy 504. Thus, by providing for service tailored to client computer 112 better QOS is achieved. In addition, by servicing user requests 1010 from a content exchange 116, a content object provider maintaining an external origin server 118 is not burdened with distributing content objects.

If the user request 1010 cannot be fulfilled by external origin server access 1040 or content distribution system access 1020, then the user request 1010 is passed through to the Internet 120. In an embodiment, the user request 1010 passed through 1060 to the Internet 120 is handled as described in relation to the standard web access function 858.

Figure 11:
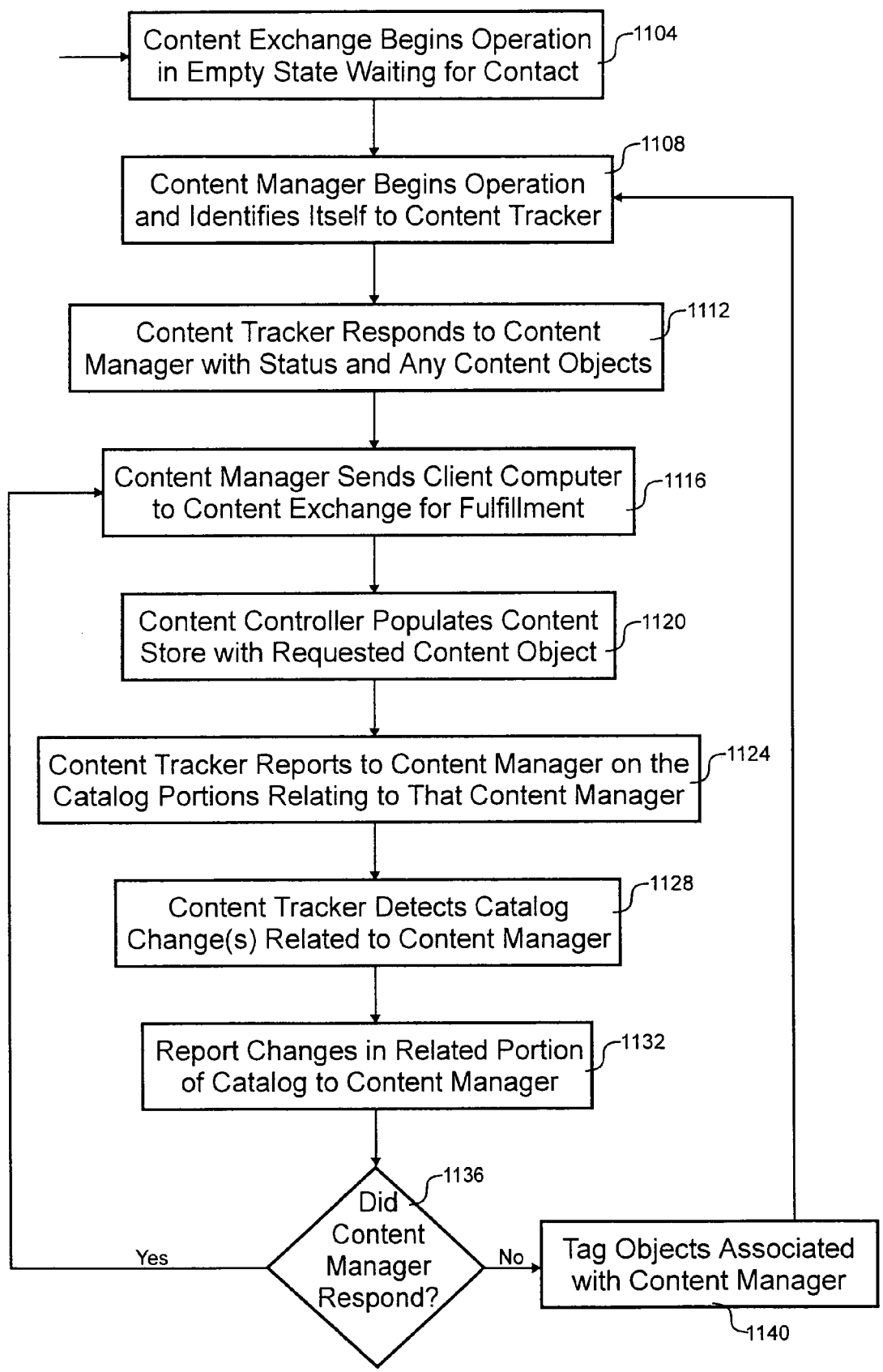
FIG. 11 is a flow diagram of an embodiment of a method for tracking content between an origin server and a content exchange.

Referring to FIG. 11, an embodiment of a method for tracking content between an origin server 108 and a content exchange 116 is shown. Even though this figure primarily shows interaction between a single origin server and a single content exchange, it is to be understood that each origin server contacts many content exchanges and each content exchange contacts many origin servers. The interaction between all the origin servers 108 and all the content exchanges 116 allows the system 600 to track content object portions.

The process begins with the content exchange and the origin server in an off-line or unavailable state. In step 1104, the content exchange 116 becomes available after beginning operation. When first becoming available, the content exchange 116 is empty and waits for client computers 112 to request content. As requests by client computers 112 are fulfilled, the content store 412 fills itself with content objects or portions of content objects.

In step 1108, the origin server 108 of this embodiment begins operation and becomes available. The origin server 108 publishes its local content catalog to the active directory 104 and identifies itself to all content trackers 404 in the system 600. A content exchange database 232 of operating content exchanges 116 is available for querying such that the content manager 312 knows the addresses of the content trackers 404.

Each content exchange 116 maintains an origin server database 424 of the origin servers 108 that have contacted it. Before an origin server 108 goes offline, the origin server 108 will attempt to contact all content exchanges 116 to notify them 116 of this change in status. Offline origin servers 108 are removed from the origin server database 424. Whenever an origin server 108 fails to respond to the content exchange 116 sending status, that origin server 108 is presumed offline and is removed from the origin server database 424.

Whenever a content exchange 116 is about to go offline, it attempts to notify the system 600. The origin servers 108 that have content objects or portions of content objects are notified such that the content exchange information 324 and the content location database 320 in each origin server 108 can remain current. Additionally, the active directory 104 is notified so the content exchange database 232 will accurately reflect the content exchanges 116 available to the system 600.

Each content tracker 404 that is contacted in step 1108, responds to the content manager 312 with status information 420 and any content objects associated with that content manager 312 in step 1112. Since the content manager 312 is just coming online, it is unlikely there are any content objects on the content store 412 that originated from the content server 308 associated with that content manager 312. The status information 420 from each content exchange 116 that responds is stored by the content manager 312 as content exchange information 324. In various embodiments, the status information 420 may be reported with or without content catalog information 416. When routing a client computer 112 to a source for a content object, the content exchange information 324 is used to determine the loading for the content exchanges under consideration. Periodically, each content tracker 400 updates all active content managers 312 with status information such that the content exchange information 324 is current. Alternative embodiment content trackers 404 could provide updated status information 420 when significant changes in status occur rather than periodically.

In step 1116, the content manager 312 sends a client computer 112 to the content exchange 116 to fulfill a request for a content object. Before redirecting the client computer 112, the content manager 312 makes a determination that a particular content exchange is the preferred source for that content object. If the whole content object is not present on the preferred content exchange 116, the content controller 408 retrieves the missing content object portions in step 1120. The client computer 112 begins downloading the content object once the beginning of the content object is available from the content exchange 116.

At a predetermined interval or when changes occur, the content tracker 404 reports to all content managers 312 the content objects and/or content object portions that are stored in the content store 412. The local content catalog 416 stores a list of the content object and/or content object portions retained in the content store 412. In step 1124, the content object possibly added in step 1120 is reported back to the origin server 108 that originally provided the content object. Each origin server 108 that has information on the content store 412 receives a report from the content tracker 404.

At some later point, further information from the local content catalog 416 is sent from the content tracker 404 to the content manager 312 in step 1128. Expiration of a timer triggers this report in step 1132, but other embodiments could report this information when changes occur. With the reports from all the content exchanges 116, the content manager 312 stores the location information in the content location database 320. Future queries to the content location database 320 by the content manager allow knowing which content exchanges 116 currently hold any content object the content manager 312 may want to redirect a client computer 112 to.

When reports of status information 420 and/or content catalog information 416 are made to a particular content manager 312, the content tracker 404 determines if the content manager 312 is accepting the information. If the content manager accepts the information, processing loops back to step 1116 where another content object is requested.

If the content manager 312 is offline, for example, the reported information from the content tracker 404 is not accepted. It may take several unsuccessful attempts at contact before the content tracker 404 concludes the content manager 312 is unavailable. The non-responsive content manager 312 is detected in step 1136. Any content objects associated with the unavailable content manager 312 are determined by a query to the local content catalog 416. The associated content objects are purged from the content store 412 to preserve room for new content objects, or they are tagged for deletion when storage space is needed. It is noted that the content tracker queries the dynamic DNS 204 during the above process to translate an origin server name to an IP address.

Figure 12:
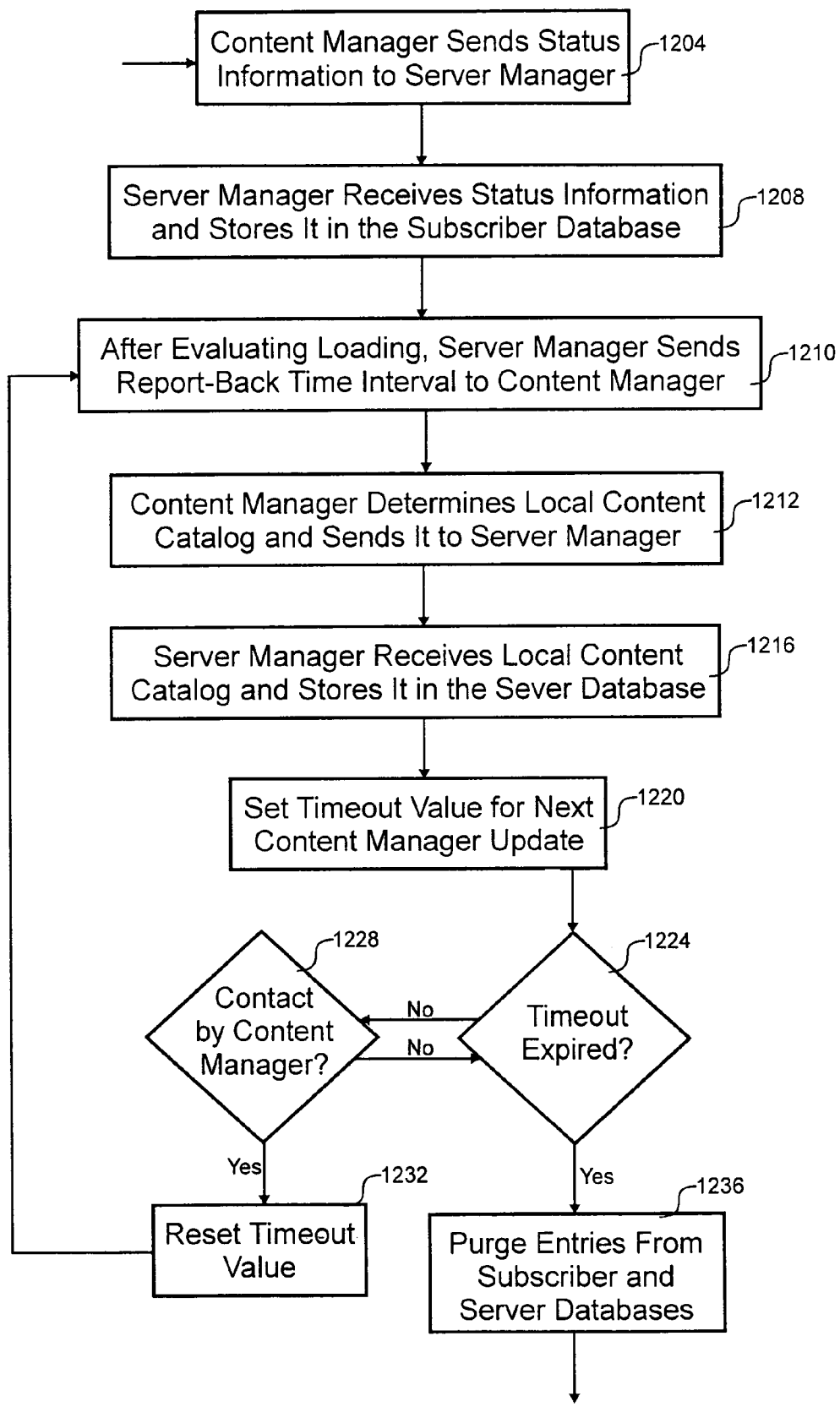
FIG. 12 is a flow diagram of an embodiment of a process for communicating information from a content manger to a server manager.

Referring next to FIG. 12, a flow diagram of an embodiment of a process for communicating information from a content manger to a server manager is shown. The depicted flow diagram shows the interaction between the active directory 104 and a single origin server 108. It is to be understood, however, that the active directory 104 interacts with a number of origin servers in a similar manner to develop an electronic directory that catalogs the number of origin servers in a server database 228. The user queries the server database 228 with a search page or directory page paradigm.

The process begins in step 1204, where the content manager 312 provides status information to the server manager 208. The status information is received by the server manager 208 and stored in the subscriber database 224 in step 1208. The subscriber database 224 holds information on all origin servers 108 currently active in the system 600.

The server manager 208 can regulate how often each origin server 108 reports back with information from the local content catalog 316. The frequency that each origin server reports the local content catalog 316 is controlled by the server manager 208 providing a report-back time interval to the content manager 312 in step 1210. The loading or utilization of the active directory 104 is analyzed to determine the amount of bandwidth that is made available to updating information in the server database 228. Based upon that loading determination, a report-back time interval is chosen and passed to the content manager 312. In one embodiment, the report-back time interval is normally set to two minutes, but can increase if the active directory becomes overloaded.

Each origin server 108 maintains the local content catalog 316 of all content objects selected by the administrator for publishing to the system 600. The first time a content manager 312 contacts the server manager 208 to report the local content catalog 316, all the entries from the catalog 316 is sent. On subsequent contacts only the changes to the local content catalog 316 can be reported to save bandwidth. In alternative embodiments, the whole local content catalog can be reported with each contact. The server manager 208 receives the local content catalog 316 or changes to the local content catalog and stores the information in the server database 228 in step 1216. Even if there are no changes to the local content catalog 316 during the report-back time interval, the origin server 108 contacts the server manager 208 such that it is known that the origin server 108 is still available.

The server manager 208 detects if any origin server 108 stops contacting it presumably because the origin server 108 is offline or otherwise unavailable. In step 1220, the server manager 208 sets a timeout value for the origin server 108. The timeout value is set to three times the report-back time interval in this embodiment, but other multiples could be used. A counter is set for the timeout value and determines when the counter reaches the timeout value.

If the counter reaches the timeout value in step 1224, the active directory 104 removes all references to the origin server 108 or tags the references for deletion when space is needed in step 1236. It is presumed, that an origin server 108 is unavailable if it does not initiate contact before the counter reaches the timeout value. The entries corresponding to the local content catalog 316 for that origin server 108 are removed from the server database 228 and the entry for the origin server 108 is removed from the subscriber database 224. By removing the entries from the databases 224, 228, any user interfacing with the directory or search pages 212, 216 is not presented links to content objects associated with that origin server 108. Alternatively, the entries corresponding to the local content catalog 316 may be tagged for deletion after the counter reaches the timeout value. Content objects tagged for deletion are overwritten when the space is needed for other content objects.

If there is contact by the origin server 108 as determined in step 1228, the active directory 104 knows the origin server 108 is behaving properly. The contact results in resetting of the counter storing the timeout value. Processing loops back to step 1210 where the server database 228 is updated and a new report-back time interval is determined. The process continues in the loop until the origin server 108 fails to report before the counter storing the timeout value expires.

Figure 13:
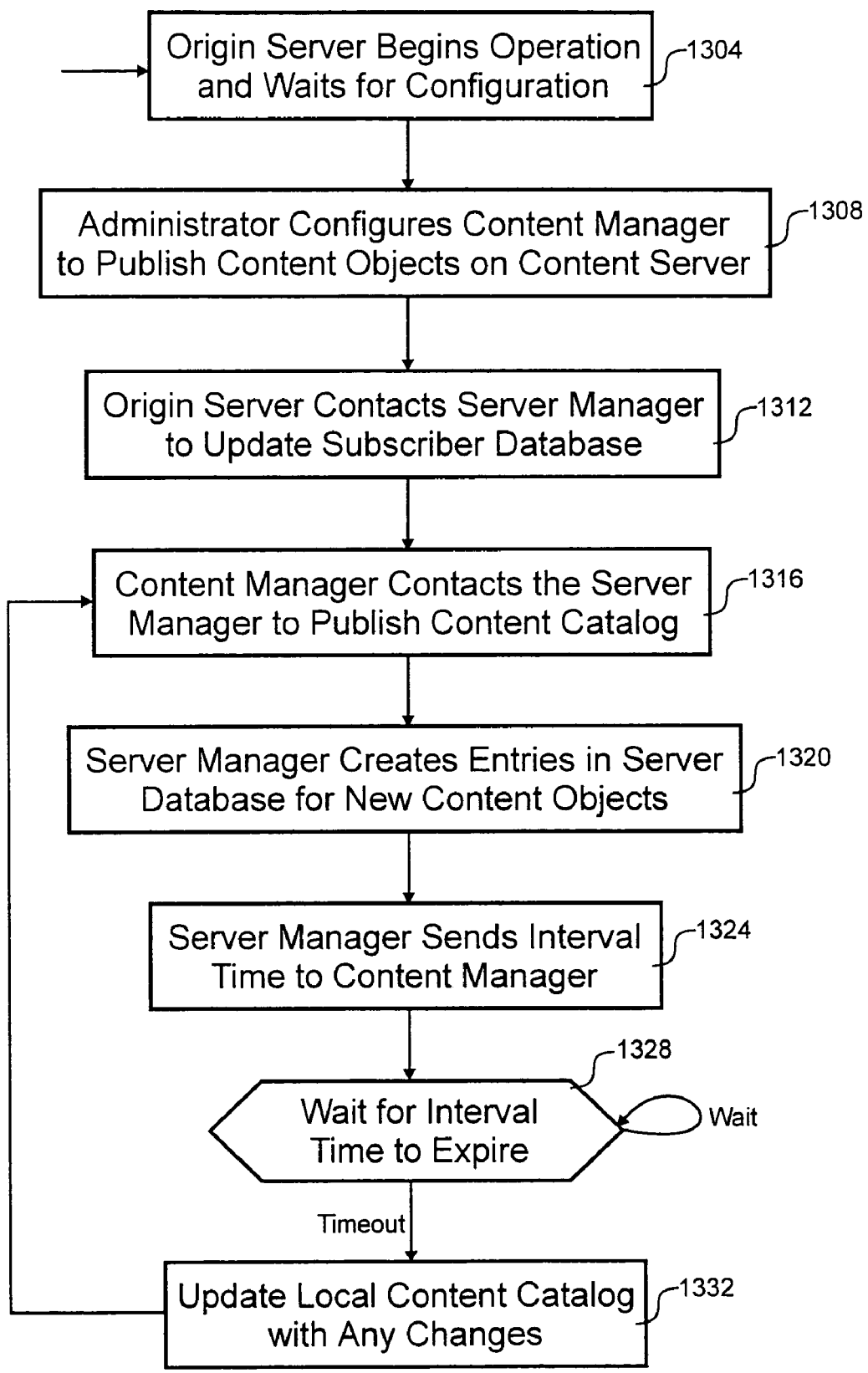
FIG. 13 is an embodiment of a flow diagram of a process for publishing information by a content manger to a server manager.

Referring to FIG. 13, an embodiment of a flow diagram of a process for publishing information by a content manger 312 to a server manager 208 is shown. An administrator of the origin server downloads software from a download page 220 of the active directory 104. The software is installed on the origin server 108. At this point, content objects are available on the content server 308 in static or streaming form. The depicted process begins in step 1304 where the origin server begins operation with content objects ready and software installed.

The administrator performs a manual selection process to select content objects in step 1308. Only a subset of the content objects on the content server 308 may be made available to the system 600 during this process. The selected content objects are entered into the local content catalog 316.

Upon first contacting the active directory 104, the content manager 312 passes information about the origin server 108 to the server manager 208 for entry into the subscriber database 224 in steps 1308 and 1312. If this is the first time the content manager 312 is contacting the active directory 104, the administrator may provide some of the information that is passed. The information added by the administrator is stored and provided with subsequent contact with the subscriber database 224.

In step 1316, the content manager 312 contacts the server manager 208 to publish the information in the local content catalog 316. The server manager 208 takes the local content catalog 316 and creates an entry in the server database 228 for each content object in step 1320. The contents of the server database 228 are used when formulating the directory and search pages 212, 216 presented to the user searching for content.

The server manager 208 controls the frequency at which all the origin servers 108 report their local content catalogs 316. If the server manager 208 is getting overloaded, the report-back period given to content managers 312 is increased. The server manager 208 can also request a content manager 312 to report-back when changes to the local content catalog 316 are detected. In this embodiment, the report-back period or interval time is two minutes and is provided to the content manager 312 in step 1324.

Before reporting back to the server manager 208, the content manager 312 waits for the interval time to expire in step 1328. Once the timer expires, the content objects on the content server 308 are scanned to determine if there should be changes to the local content catalog 316. Once changes are made in step 1332, the processing loops back to step 1316 where the local content catalog 316 is published to the server database 228 once again. The whole local content catalog could be provided in step 1316 for the first contact, but only changes could be provided to update the information in subsequent contacts to reduce the size of the information.

Figure 14:
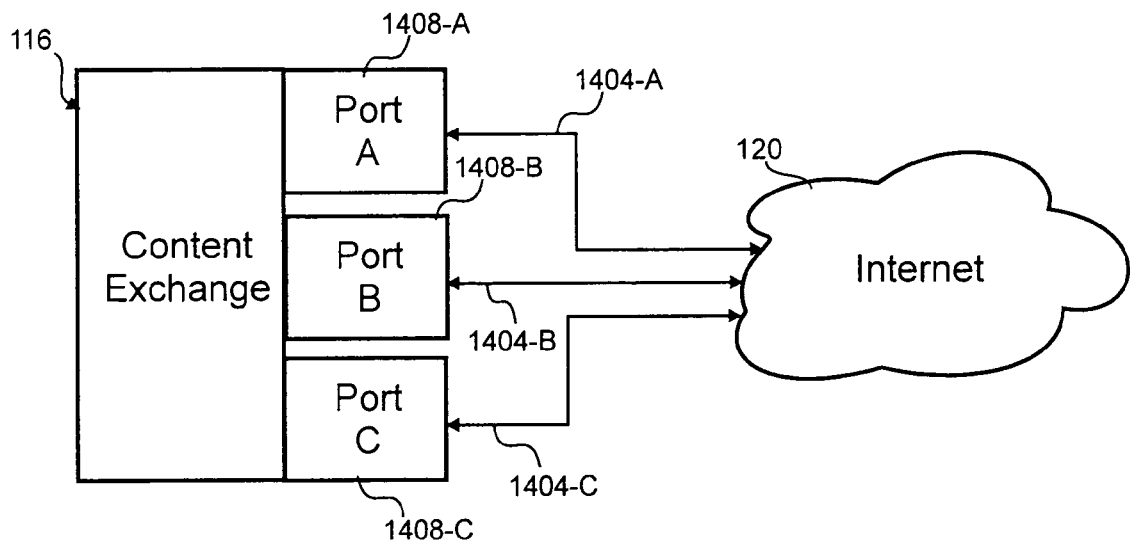
FIG. 14 is a block diagram of an embodiment of the content exchange which shows multiple providers connected through separate ports.

Referring next to FIG. 14, a block diagram of an embodiment of the content exchange 116 which shows multiple providers connected through separate ports 1408 is shown. Three datapaths 1404 are logically separated by Internet protocol ports 1408 for the content exchange 116. The ports 1408 are used to demultiplex the logical datapaths 1408 even though they may physically share a common conduit. By having multiple ports 1408, the traffic associated with those ports 1408 can be regulated.

For example, the content exchange 116 may be used to provide content objects from an external origin server 118. The administrator of the external origin server may wish to divide traffic between three bandwidth providers. Port A 1408-A could be associated with provider A, port B 1408-B could be associated with provider B and port C 1408-C could be associated with provider C. The content exchange can monitor activity on any of those ports and report that information to the providers such that they can bill the external origin server 118 appropriately for carrying that bandwidth.

The requests from the client computers 112 could be divided among the ports 1408 according to a scheme determined by the external origin server 118 to allocate bandwidth among the providers. In one embodiment, each client computer 112 cycles through the three ports 1408 according to a weighting function. In another embodiment, each client computer is assigned a different port 1408 to use. In yet another embodiment, a determination of QOS for each port 1408 influences the choice of port 1408 the client computer 112 uses. By using these techniques, the client computers 112 in the system 600 can influence the amount of bandwidth that is purchased from each provider.

Figure 15:
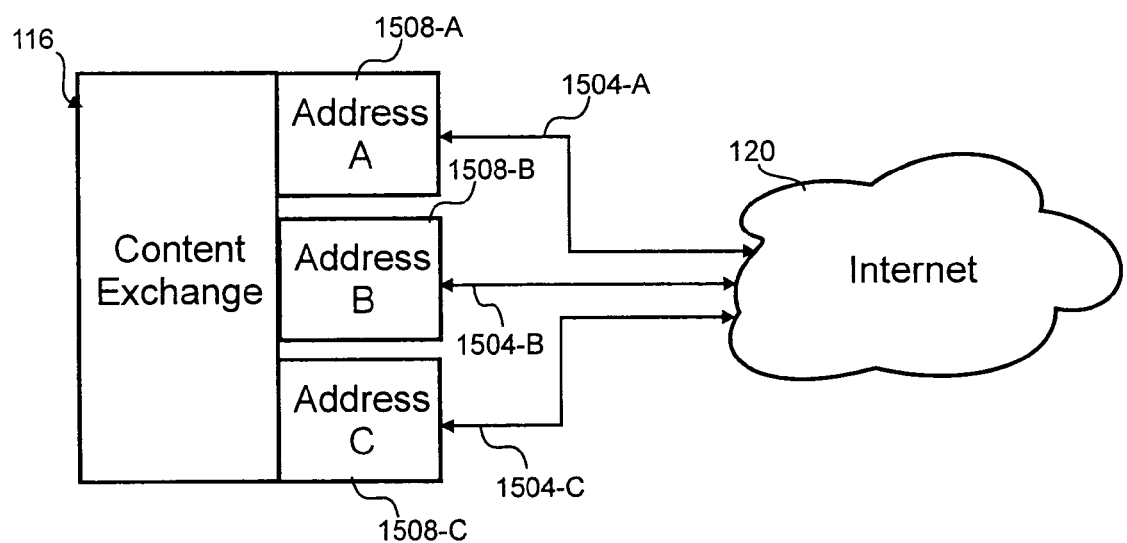
FIG. 15 is a block diagram of another embodiment of the content exchange which shows multiple providers connected through separate addresses.

With reference to FIG. 15, a block diagram of another embodiment of the content exchange 116 which shows multiple providers connected through separate addresses 1508 is shown. In this embodiment, three IP addresses 1508 are used to logically separate the three datapaths 1504 from each other. Although the logical datapaths are primarily envisioned to separate bandwidth by provider, the logical datapaths could separate security levels, subsets of content objects, or other things.

Figure 16:
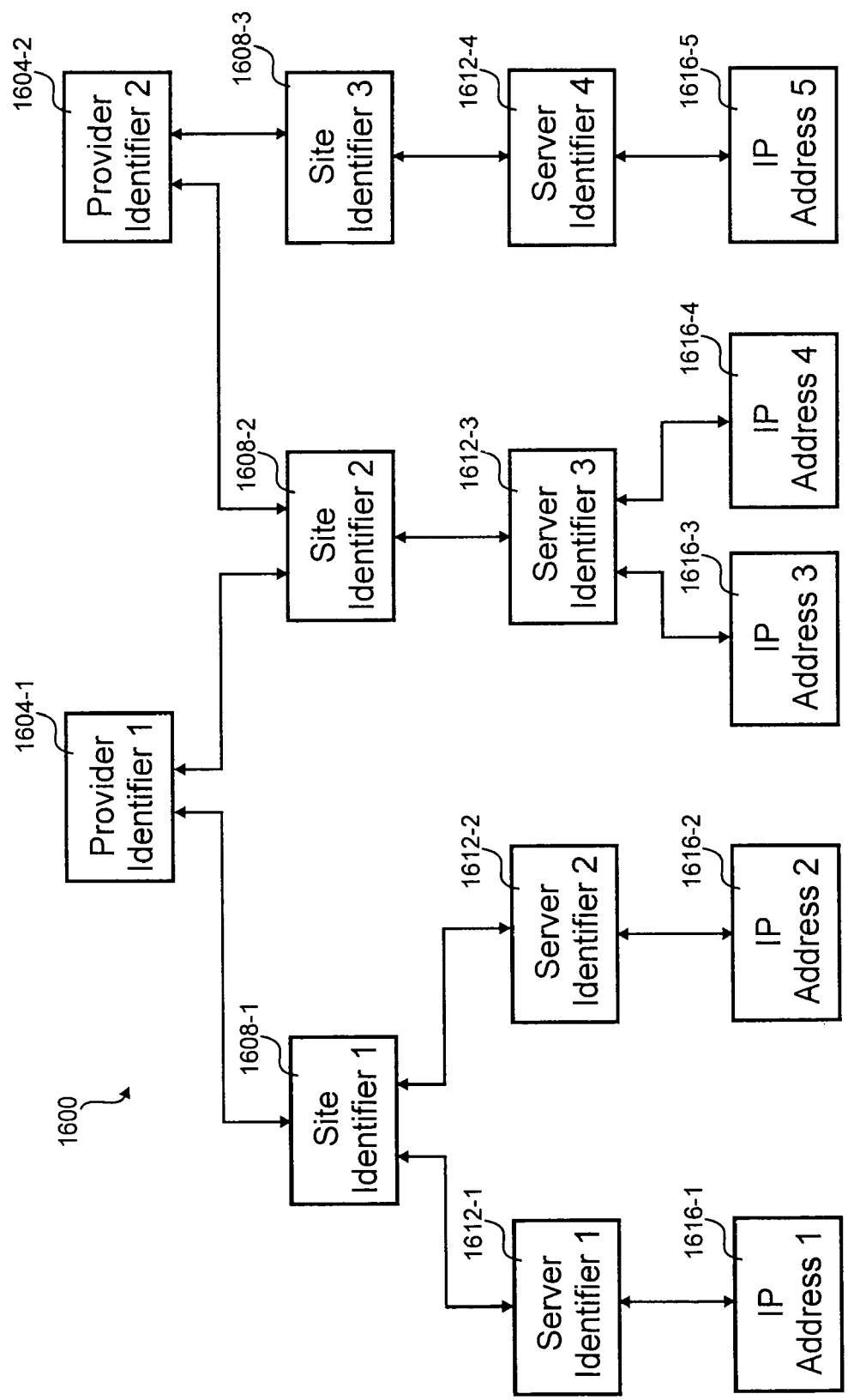
FIG. 16 is a hierarchical representation of an embodiment of grouping of providers and content exchanges.

Referring next to FIG. 16, a hierarchical representation of an embodiment of grouping of providers 1604 and content exchanges 116 is shown. In this embodiment there are two bandwidth providers 1604. Each provider 1604 has a site 1608-1, 1608-3 exclusive to themselves and a site 1608-2 that is shared. Sites 1608 are physical locations that house one or more servers 1612 and correspond to a single content exchange 116 that could include multiple servers 1612.

Each server 1612-3 in a shared site 1608-2 has separate IP addresses 1616-3, 1616-4 for each provider 1604 sharing that site 1608-2. The two IP addresses 1616-3, 1616-4 allow logical separation of the traffic to a given shared site 1602-2. Logical separation allows attributing content object requests and the bandwidth to service those requests to individual providers 1604 even though all traffic may share the same physical conduit at times. Some embodiments could keep the traffic associated with each provider physically separate by filtering on the IP address 1616. In this way the bandwidth may be allocated among providers 1604.

Figure 17:
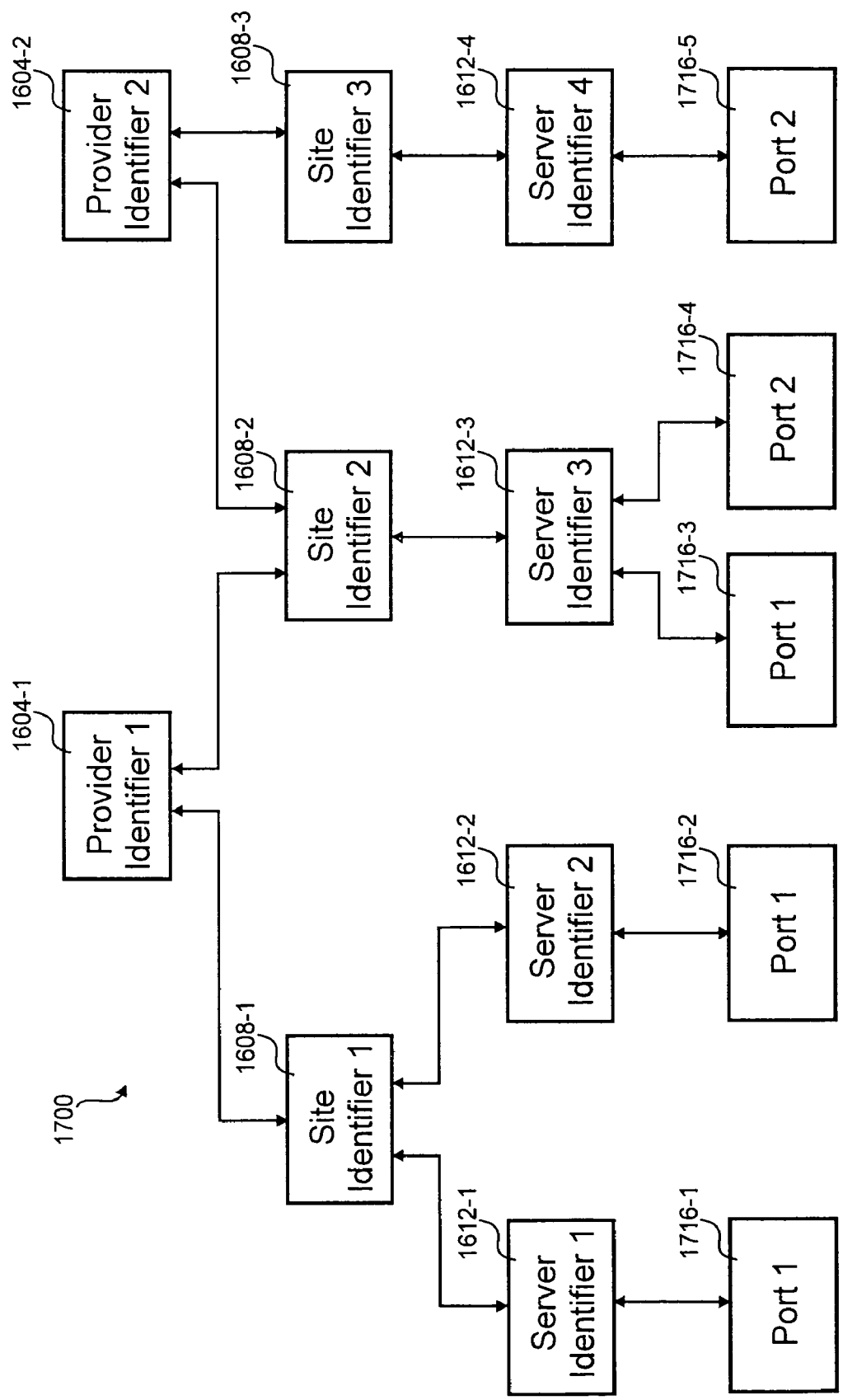
FIG. 17 is a hierarchical representation of another embodiment of grouping of providers and content exchanges.

Referring next to FIG. 17, a hierarchical representation of another embodiment of grouping of providers and content exchanges. In this embodiment, ports 1716 are used to differentiate logical datapaths to servers 1612. Port one 1716-3 is associated with provider one 1604-1 and port two 1716-4 is associated with provider two 1604-2 on the sites 1608-2 that service multiple providers 1604. In some embodiments, each provider could have a range of ports associated with them rather than a single universal port on all servers.

In light of the above description, a number of advantages of the present invention are readily apparent. For example, the user is presented links that are substantially free of expired and stale information. Content object links are as current as the maximum timeout value. Additionally, crawlers are not necessary to gather information on content objects from the origin servers.

A number of variations and modifications of the invention can also be used. For example, the origin server could gather the local content catalog and report it at the request of the active directory rather than setting timers. Additionally, the active directory could catalog things such as web page text in a manner similar to Google™, Alta Vista™ or other search engines.

Although the invention is described with reference to specific embodiments thereof, the embodiments are merely illustrative, and not limiting, of the invention, the scope of which is to be determined solely by the appended claims.

What is claimed is:

1. A directory for cataloging information on a network, the directory comprising:
   a first conduit between the directory and a first site;
   a second conduit between the directory and a second site;
   a receiver function to accept:
      a first local catalog of directory information from the first site and
      a second local catalog of directory information from the second site;
   a global catalog of directory information that comprises the first local catalog and the second local catalog; and
   a first timer, wherein the first local catalog is removed from the global catalog if the first site fails to autonomously report in before a first timer expires.

2. The directory for cataloging information on a network as recited in claim 1, wherein each of the first site and second site respectively reports the first local catalog and second local catalog to the receiver function according to a predetermined schedule.

3. The directory for cataloging information on a network as recited in claim 1, wherein the first conduit and the second conduit each comprise the Internet.

4. The directory for cataloging information on a network as recited in claim 1, wherein the first and second local catalogs provide location information for a plurality of content objects.

5. The directory for cataloging information on a network as recited in claim 4, wherein the location information comprises at least two of a path, a file name, and an address.

6. The directory for cataloging information on a network as recited in claim 1, further comprising
   a second timer, wherein
      the second local catalog is removed from the global catalog if the second site fails to autonomously report in before the second timer expires.

7. The directory for cataloging information on a network as recited in claim 1, further comprising a directory web page that is coupled to the global catalog, the directory web page adapted for display to a user, the directory web page organizing at least a plurality of content objects included in the global catalog by categories.

8. A directory for cataloging information on the Internet, the directory comprising:
   a plurality of connects to a plurality of sites, wherein:
      there is at least one connection per site, and
      at least one of the plurality of connections is active at a time;
   a receiver to accept a plurality of local catalogs of directory information from the plurality of sites;
   a global catalog of directory information that comprises the plurality of local catalogs; and a first timer, wherein a first local catalog is removed from the global catalog if a first site fails to autonomously report in before the first timer expires.

9. The directory for cataloging information on the Internet as recited in claim 8, wherein each of the plurality of sites periodically report their respective local catalog to the receiver.

10. The directory for cataloging information on the Internet as recited in claim 8, wherein at least one of the plurality of connections comprise the Internet.

11. The directory for cataloging information on the Internet as recited in claim 8, wherein the plurality of local catalogs provide location information for a plurality of content objects.

12. The directory for cataloging information on the Internet as recited in claim 11, wherein the location information comprises at least two of a path, a file name, and an address.

13. The directory for cataloging information on the Internet as recited in claim 8, further comprising
a second timer, wherein:
a second local catalog is removed from the global catalog if a second site fails to autonomously report in before the second timer expires.

14. The directory for cataloging information on the Internet as recited in claim 8, further comprising at least one of a search web page and a directory web page that is coupled to the global catalog.

15. A directory system for cataloging information on a packet switched network, the directory system including:
a first site comprising first directory information;
a second site comprising second directory information; and
a third site comprising third directory information, wherein:
the first directory information is sent over the packet switched network to the third site,
the second directory information is sent over the packet switched network to the third site, and
the first directory information and second directory information is a subset of the third directory information; and
a first timer, wherein the first directory information is removed from the third directory information if the first site fails to autonomously report in before the first timer expires.

16. The directory system for cataloging information on the packet switched network as recited in claim 15, wherein each of the first site and second site respectively reports the first directory information and second directory information to the third site periodically.

17. The directory system for cataloging information on the packet switched network as recited in claim 15, wherein the packet switched comprises the Internet.

18. The directory system for cataloging information on the packet switched network as recited in claim 15, wherein the first and second directory information provides location information for a plurality of content objects.

19. The directory system for cataloging information on the packet switched network as recited in claim 18, wherein the location information comprises at least two of a path, a file name, and an address.

20. The directory system for cataloging information on the packet switched network as recited in claim 15, further comprising
a second timer, wherein:
the second directory information is removed from the third directory if the second site fails to autonomously report in before the second timer expires.

21. The directory system of claim 15, wherein the first directory information includes content objects selected for publication to the third directory information by an administrator of the first site.

* * * * *